(12) United States Patent
Wang et al.

(10) Patent No.: US 12,483,919 B2
(45) Date of Patent: Nov. 25, 2025

(54) SIDELINK MEASUREMENT REPORTING FOR SIDELINK RELAYS

(71) Applicant: QUALCOMM Incorporated, San Diego, CA (US)

(72) Inventors: Hua Wang, Basking Ridge, NJ (US); Sony Akkarakaran, Poway, CA (US); Jelena Damnjanovic, Del Mar, CA (US); Tao Luo, San Diego, CA (US); Junyi Li, Fairless Hills, PA (US); Konstantinos Dimou, New York City, NY (US)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 17/823,723

(22) Filed: Aug. 31, 2022

(65) Prior Publication Data
US 2024/0073725 A1    Feb. 29, 2024

(51) Int. Cl.
*H04W 24/10* (2009.01)
*H04W 72/20* (2023.01)
*H04W 88/04* (2009.01)

(52) U.S. Cl.
CPC ........... *H04W 24/10* (2013.01); *H04W 72/20* (2023.01); *H04W 88/04* (2013.01)

(58) Field of Classification Search
CPC ...... H04W 88/04; H04W 76/23; H04W 24/10
See application file for complete search history.

(56) References Cited

U.S. PATENT DOCUMENTS

| | | | |
|---|---|---|---|
| 2023/0049573 A1* | 2/2023 | Zhang | H04W 76/23 |
| 2024/0073725 A1* | 2/2024 | Wang | H04W 36/0058 |
| 2024/0080708 A1* | 3/2024 | Rao | H04W 28/0268 |
| 2024/0155492 A1* | 5/2024 | Fan | H04L 5/0091 |
| 2024/0172066 A1* | 5/2024 | Hong | H04W 36/0058 |
| 2024/0187935 A1* | 6/2024 | Rao | H04W 72/02 |

FOREIGN PATENT DOCUMENTS

CN        109246659 A      1/2019

OTHER PUBLICATIONS

International Search Report and Written Opinion—PCT/US2023/029394—ISA/EPO—Dec. 6, 2023 (2203422WO).

* cited by examiner

*Primary Examiner* — Raj Jain
(74) *Attorney, Agent, or Firm* — Holland & Hart LLP

(57) ABSTRACT

Methods, systems, and devices for wireless communications are described. For example, the described techniques provide for performing and reporting suitable measurements, at a first user equipment (UE), on reference signals from relay UEs to determine which relay UEs to activate or deactivate for relaying communications for the first UE. The first UE may be configured to perform measurements on deactivated relay UEs, and the first UE may report these measurements (or other measurements) when one or more events are triggered. The events may depend on the measurements performed on the deactivated relay UEs. Once the events are triggered, the first UE may report the measurements, and a second UE or a network entity may use the measurements to efficiently determine which relay UEs to activate or deactivate for relaying communications for the first UE.

30 Claims, 15 Drawing Sheets

SIDELINK MEASUREMENT REPORTING FOR SIDELINK RELAYS

FIELD OF TECHNOLOGY

The following relates to wireless communications, including sidelink measurement reporting for sidelink relays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

SUMMARY

The described techniques relate to improved methods, systems, devices, and apparatuses that support sidelink measurement reporting for sidelink relays. For example, the described techniques enable a user equipment (UE) to perform and report suitable measurements of reference signals from relay UEs to determine which relay UEs to activate or deactivate for relaying communications for the first UE. For example, a first UE may be configured to perform measurements on deactivated relay UEs, and the first UE may report these measurements (or other measurements) when one or more events are triggered. The events may depend on the measurements performed on the deactivated relay UEs. Once the events are triggered, the first UE may report the measurements, and a second UE or a network entity may use the measurements to efficiently determine which relay UEs to activate or deactivate for relaying communications for the first UE.

A method for wireless communication at a first UE is described. The method may include receiving an indication of one or more parameters, the one or more parameters for performing and reporting a first measurement of a first measurement object associated with a deactivated relay UE, performing the first measurement of the first measurement object associated with the deactivated relay UE in accordance with the one or more parameters, and transmitting a report indicating the first measurement based on one or more criteria associated with an event being satisfied, where the one or more criteria are based on the first measurement of the first measurement object associated with the deactivated relay UE.

An apparatus for wireless communication at a first UE is described. The apparatus may include a processor, memory coupled with the processor, and instructions stored in the memory. The instructions may be executable by the processor to cause the apparatus to receive an indication of one or more parameters, the one or more parameters for performing and reporting a first measurement of a first measurement object associated with a deactivated relay UE, perform the first measurement of the first measurement object associated with the deactivated relay UE in accordance with the one or more parameters, and transmit a report indicating the first measurement based on one or more criteria associated with an event being satisfied, where the one or more criteria are based on the first measurement of the first measurement object associated with the deactivated relay UE.

Another apparatus for wireless communication at a first UE is described. The apparatus may include means for receiving an indication of one or more parameters, the one or more parameters for performing and reporting a first measurement of a first measurement object associated with a deactivated relay UE, means for performing the first measurement of the first measurement object associated with the deactivated relay UE in accordance with the one or more parameters, and means for transmitting a report indicating the first measurement based on one or more criteria associated with an event being satisfied, where the one or more criteria are based on the first measurement of the first measurement object associated with the deactivated relay UE.

A non-transitory computer-readable medium storing code for wireless communication at a first UE is described. The code may include instructions executable by a processor to receive an indication of one or more parameters, the one or more parameters for performing and reporting a first measurement of a first measurement object associated with a deactivated relay UE, perform the first measurement of the first measurement object associated with the deactivated relay UE in accordance with the one or more parameters, and transmit a report indicating the first measurement based on one or more criteria associated with an event being satisfied, where the one or more criteria are based on the first measurement of the first measurement object associated with the deactivated relay UE.

Some examples of the method, apparatuses, and non-transitory computer-readable medium described herein may further include operations, features, means, or instructions for performing a second measurement of a second measurement object associated with an activated relay UE, where the one or more criteria associated with the event being satisfied includes a first value that may be based on the first measurement being greater, by an offset, than a second value that may be based on the second measurement, and where transmitting the report indicating the first measurement may be based on the first value being greater than the second value by the offset.

In some examples of the method, apparatuses, and non-transitory computer-readable medium described herein, the one or more criteria associated with the event being satisfied includes a first value that may be based on the first measurement being greater than a threshold by an offset and transmitting the report indicating the first measurement may be based on the first value being greater than the threshold by the offset.

Some examples of the method, apparatuses, and non-transitory computer-readable medium described herein may further include operations, features, means, or instructions for performing a second measurement of a second measurement object associated with an activated relay UE, where the one or more criteria associated with the event being satisfied includes a first value that may be based on the first measurement being greater than a first threshold and a second value that may be based on the second measurement being less than a second threshold, and where transmitting the report indicating the first measurement may be based on the first value being greater than the first threshold and the second value being less than the second threshold.

In some examples of the method, apparatuses, and non-transitory computer-readable medium described herein, receiving the indication of the one or more parameters may include operations, features, means, or instructions for receiving an indication of an offset associated with the first measurement object associated with the deactivated relay UE, where the offset may be used to determine whether the one or more criteria associated with the event may be satisfied.

In some examples of the method, apparatuses, and non-transitory computer-readable medium described herein, receiving the indication of the one or more parameters may include operations, features, means, or instructions for receiving an indication of one or more thresholds associated with the event, where the one or more thresholds may be used to determine whether the one or more criteria associated with the event may be satisfied.

In some examples of the method, apparatuses, and non-transitory computer-readable medium described herein, receiving the indication of the one or more parameters may include operations, features, means, or instructions for receiving an indication of one or more deactivated relay UEs to add to a list of relay UEs for which the first UE may be to perform and report measurements.

In some examples of the method, apparatuses, and non-transitory computer-readable medium described herein, receiving the indication of the one or more parameters may include operations, features, means, or instructions for receiving an indication of one or more deactivated relay UEs to remove from a list of relay UEs for which the first UE may be to perform and report measurements.

In some examples of the method, apparatuses, and non-transitory computer-readable medium described herein, transmitting the report indicating the first measurement may include operations, features, means, or instructions for transmitting the report indicating the first measurement and indicating the deactivated relay UE for which the first measurement may be reported.

In some examples of the method, apparatuses, and non-transitory computer-readable medium described herein, receiving the indication of the one or more parameters may include operations, features, means, or instructions for receiving the indication of the one or more parameters from the deactivated relay UE.

In some examples of the method, apparatuses, and non-transitory computer-readable medium described herein, the one or more parameters include one or more first parameters and the method, apparatuses, and non-transitory computer-readable medium may include further operations, features, means, or instructions for transmitting an indication of one or more second parameters, the one or more second parameters for performing and reporting the first measurement of the first measurement object associated with the deactivated relay UE, where the one or more first parameters may be based on the one or more second parameters.

In some examples of the method, apparatuses, and non-transitory computer-readable medium described herein, the one or more parameters include one or more hysteresis values, one or more thresholds, one or more offsets, or a combination thereof.

A method for wireless communication at a network entity is described. The method may include transmitting, to a first UE, an indication of one or more parameters, the one or more parameters for performing and reporting a first measurement of a first measurement object associated with a deactivated relay UE and receiving, from the first UE, a report indicating the first measurement based on one or more criteria associated with an event being satisfied, where the one or more criteria are based on the first measurement of the first measurement object associated with the deactivated relay UE.

An apparatus for wireless communication at a network entity is described. The apparatus may include a processor, memory coupled with the processor, and instructions stored in the memory. The instructions may be executable by the processor to cause the apparatus to transmit, to a first UE, an indication of one or more parameters, the one or more parameters for performing and reporting a first measurement of a first measurement object associated with a deactivated relay UE and receive, from the first UE, a report indicating the first measurement based on one or more criteria associated with an event being satisfied, where the one or more criteria are based on the first measurement of the first measurement object associated with the deactivated relay UE.

Another apparatus for wireless communication at a network entity is described. The apparatus may include means for transmitting, to a first UE, an indication of one or more parameters, the one or more parameters for performing and reporting a first measurement of a first measurement object associated with a deactivated relay UE and means for receiving, from the first UE, a report indicating the first measurement based on one or more criteria associated with an event being satisfied, where the one or more criteria are based on the first measurement of the first measurement object associated with the deactivated relay UE.

A non-transitory computer-readable medium storing code for wireless communication at a network entity is described. The code may include instructions executable by a processor to transmit, to a first UE, an indication of one or more parameters, the one or more parameters for performing and reporting a first measurement of a first measurement object associated with a deactivated relay UE and receive, from the first UE, a report indicating the first measurement based on one or more criteria associated with an event being satisfied, where the one or more criteria are based on the first measurement of the first measurement object associated with the deactivated relay UE.

Some examples of the method, apparatuses, and non-transitory computer-readable medium described herein may further include operations, features, means, or instructions for transmitting, to the first UE, an indication of one or more other parameters, the one or more other parameters for performing and reporting a second measurement of a second measurement object associated with an activated relay UE, where the one or more criteria associated with the event being satisfied includes a first value that may be based on the first measurement being greater, by an offset, than a second value that may be based on the second measurement, and where receiving the report indicating the first measurement may be based on the first value being greater than the second value by the offset.

In some examples of the method, apparatuses, and non-transitory computer-readable medium described herein, the one or more criteria associated with the event being satisfied includes a first value that may be based on the first measurement being greater than a threshold by an offset and receiving the report indicating the first measurement may be based on the first value being greater than the threshold by the offset.

Some examples of the method, apparatuses, and non-transitory computer-readable medium described herein may further include operations, features, means, or instructions for transmitting, to the first UE, an indication of one or more other parameters, the one or more other parameters for performing and reporting a second measurement of a second measurement object associated with an activated relay UE, where the one or more criteria associated with the event being satisfied includes a first value that may be based on the first measurement being greater than a first threshold and a second value that may be based on the second measurement being less than a second threshold, and where receiving the report indicating the first measurement may be based on the first value being greater than the first threshold and the second value being less than the second threshold.

In some examples of the method, apparatuses, and non-transitory computer-readable medium described herein, transmitting the indication of the one or more parameters may include operations, features, means, or instructions for transmitting an indication of an offset associated with the first measurement object associated with the deactivated relay UE, where the offset may be used to determine whether the one or more criteria associated with the event may be satisfied.

In some examples of the method, apparatuses, and non-transitory computer-readable medium described herein, transmitting the indication of the one or more parameters may include operations, features, means, or instructions for transmitting an indication of one or more thresholds associated with the event, where the one or more thresholds may be used to determine whether the one or more criteria associated with the event may be satisfied.

In some examples of the method, apparatuses, and non-transitory computer-readable medium described herein, transmitting the indication of the one or more parameters may include operations, features, means, or instructions for transmitting an indication of one or more deactivated relay UEs to add to a list of relay UEs for which the first UE may be to perform and report measurements.

Some examples of the method, apparatuses, and non-transitory computer-readable medium described herein may further include operations, features, means, or instructions for receiving an indication of one or more deactivated relay UEs to remove from a list of relay UEs for which the first UE may be to perform and report measurements.

In some examples of the method, apparatuses, and non-transitory computer-readable medium described herein, receiving the report indicating the first measurement may include operations, features, means, or instructions for receiving the report indicating the first measurement and indicating the deactivated relay UE for which the first measurement may be reported.

In some examples of the method, apparatuses, and non-transitory computer-readable medium described herein, the one or more parameters include one or more hysteresis values, one or more thresholds, one or more offsets, or a combination thereof.

A method for wireless communication at a relay UE is described. The method may include receiving, from a first UE, an indication of one or more second parameters, the one or more second parameters for performing and reporting a first measurement of a first measurement object associated with the relay UE and transmitting, to the first UE, an indication of one or more first parameters, the one or more first parameters for performing and reporting the first measurement of the first measurement object associated with the relay UE, where the one or more first parameters are based on the one or more second parameters.

An apparatus for wireless communication at a relay UE is described. The apparatus may include a processor, memory coupled with the processor, and instructions stored in the memory. The instructions may be executable by the processor to cause the apparatus to receive, from a first UE, an indication of one or more second parameters, the one or more second parameters for performing and reporting a first measurement of a first measurement object associated with the relay UE and transmit, to the first UE, an indication of one or more first parameters, the one or more first parameters for performing and reporting the first measurement of the first measurement object associated with the relay UE, where the one or more first parameters are based on the one or more second parameters.

Another apparatus for wireless communication at a relay UE is described. The apparatus may include means for receiving, from a first UE, an indication of one or more second parameters, the one or more second parameters for performing and reporting a first measurement of a first measurement object associated with the relay UE and means for transmitting, to the first UE, an indication of one or more first parameters, the one or more first parameters for performing and reporting the first measurement of the first measurement object associated with the relay UE, where the one or more first parameters are based on the one or more second parameters.

A non-transitory computer-readable medium storing code for wireless communication at a relay UE is described. The code may include instructions executable by a processor to receive, from a first UE, an indication of one or more second parameters, the one or more second parameters for performing and reporting a first measurement of a first measurement object associated with the relay UE and transmit, to the first UE, an indication of one or more first parameters, the one or more first parameters for performing and reporting the first measurement of the first measurement object associated with the relay UE, where the one or more first parameters are based on the one or more second parameters.

In some examples of the method, apparatuses, and non-transitory computer-readable medium described herein, the one or more first parameters or the one or more second parameters include one or more hysteresis values, one or more thresholds, one or more offsets, or a combination thereof.

DETAILED DESCRIPTION

Figure 1:
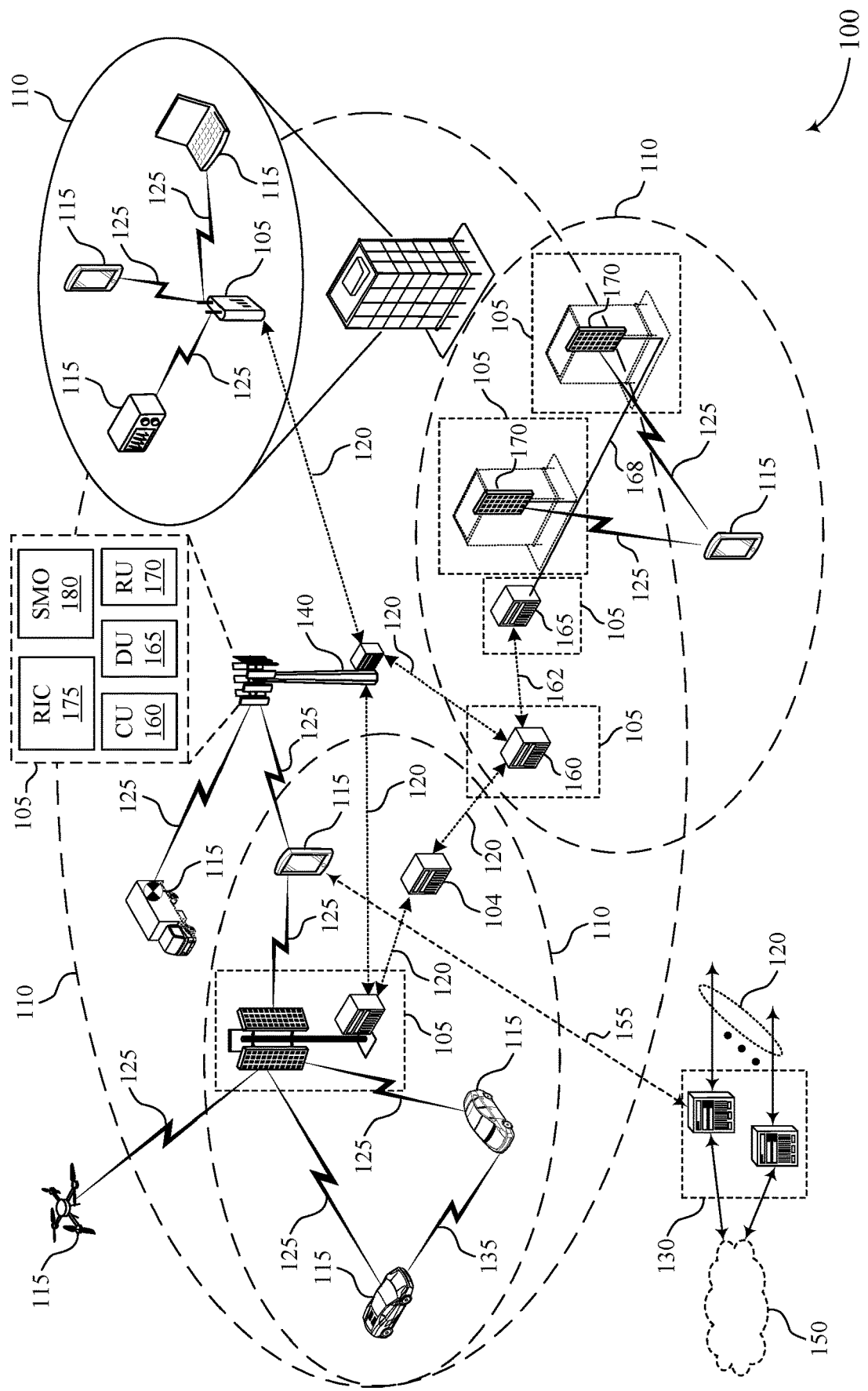
FIG. 1 illustrates an example of a wireless communications system that supports sidelink measurement reporting for sidelink relays in accordance with one or more aspects of the present disclosure.

In some wireless communications systems, a user equipment (UE) may act as a relay for communications between devices. A UE acting as a relay may be referred to as a relay UE, a UE relay, a relay, or a sidelink relay. A relay UE may relay communications (e.g., signaling) between a first UE and a network entity (e.g., uplink or downlink communications) or communications between a first UE and a second UE (e.g., sidelink communications). In some examples, a first UE may be configured with multiple relay UEs that may relay communications between the first UE and other devices. These relay UEs may include activated relay UEs and deactivated relay UEs. The activated relay UEs may relay communications between the first UE and other devices, and the deactivated relay UEs may be activated subsequently for relaying communications between the first UE and other devices. Thus, it may be appropriate to determine which relay UEs to activate or deactivate for relaying communications for a first UE.

In some examples, a first UE may perform and report measurements on reference signals from activated relay UEs for determining whether to deactivate one or more of the activated relay UEs or whether to activate one or more deactivated relay UEs. The first UE may also be triggered to report the measurements based on the measurements themselves. For instance, the first UE may report measurements performed on reference signals from an activated relay UE based on the measurements satisfying a threshold. A second UE or a network entity may use measurements performed and reported by the first UE to determine which relay UEs to activate or deactivate for relaying communications for the first UE. In some examples, however, the measurements used to determine which relay UEs to activate or deactivate may be insufficient. Accordingly, the power, processing resources, and network resources used to perform and report these measurements may be wasted.

The described techniques enable a first UE to perform and report suitable measurements on reference signals from relay UEs such that a second UE or a network entity may more efficiently determine which relay UEs to activate or deactivate for relaying communications for the first UE. For instance, the first UE may be configured to perform measurements of deactivated relay UEs to more efficiently determine which relay UEs to activate or deactivate for relaying communications for the first UE. Additionally, or alternatively, the first UE may be configured to report measurements when one or more events are triggered, and the events may depend on measurements performed on deactivated relay UEs. If one or more criteria of the events are satisfied, the first UE may report measurements performed on reference signals received from activated relay UEs, deactivated relay UEs, or both, and a second UE or a network entity may use the measurements to efficiently determine which relay UEs to activate or deactivate for relaying communications for the first UE.

Aspects of the disclosure are initially described in the context of wireless communications systems. Aspects of the disclosure are further illustrated by and described with reference to apparatus diagrams, system diagrams, and flowcharts that relate to sidelink measurement reporting for sidelink relays.

FIG. 1 illustrates an example of a wireless communications system 100 that supports sidelink measurement reporting for sidelink relays in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support sidelink measurement reporting for sidelink relays as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 (e.g., in a physical downlink control channel (PDCCH) or a physical downlink shared channel (PDSCH)), uplink transmissions (e.g., return link transmissions) from a UE 115 to a network entity 105 (e.g., in a physical uplink control channel (PUCCH) or a physical uplink shared channel (PUSCH)), or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In wireless communications system 100, a UE 115 may act as a relay for communications between devices. A UE 115 acting as a relay may be referred to as a relay UE 115, a UE relay, a relay, or a sidelink relay. A relay UE 115 may relay communications (e.g., signaling, messages) between a first UE 115 and a network entity 105 (e.g., uplink or downlink communications) or communications between a first UE 115 and a second UE 115 (e.g., sidelink communications). In some examples, a first UE 115 may be configured with multiple relay UEs 115 that may relay communications between the first UE 115 and other devices. These relay UEs 115 may include activated relay UEs 115 and deactivated relay UEs 115. The activated relay UEs 115 may relay communications between the first UE 115 and other devices, and the deactivated relay UEs 115 may be activated subsequently for relaying communications between the first UE 115 and other devices. Thus, it may be appropriate to determine which relay UEs 115 to activate or deactivate for relaying communications for a first UE 115.

In some examples, a first UE 115 may perform and report measurements on reference signals from activated relay UEs 115 for determining whether to deactivate one or more of the activated relay UEs 115 or whether to activate one or more deactivated relay UEs 115. The first UE 115 may also be triggered to report the measurements based on the measurements themselves. For instance, the first UE 115 may report measurements performed on reference signals from an activated relay UE 115 based on the measurements satisfying a threshold. A second UE 115 or a network entity 105 may use measurements performed and reported by the first UE 115 to determine which relay UEs 115 to activate or deactivate for relaying communications for the first UE 115. In some examples, however, the measurements used to determine which relay UEs 115 to activate or deactivate may be insufficient. Accordingly, the power, processing resources, and physical resources used to perform and report these measurements may be wasted to some degree.

The wireless communications system 100 may support efficient techniques for configuring a first UE 115 to perform and report suitable measurements on reference signals from relay UEs 115 such that a second UE 115 or a network entity 105 may more efficiently determine which relay UEs 115 to activate or deactivate for relaying communications for the first UE 115. For instance, the first UE 115 may be configured to perform measurements on deactivated relay UEs 115 to more efficiently determine which relay UEs 115 to activate or deactivate for relaying communications for the first UE 115. Additionally, or alternatively, the first UE 115 may be configured to report measurements when one or more events are triggered, and the events may depend on measurements performed on deactivated relay UEs 115. Once one or more criteria of the events are satisfied, the first UE 115 may report measurements performed on reference signals received from activated relay UEs 115, deactivated relay UEs 115, or both, and a second UE 115 or a network entity 105 may use the measurements to efficiently determine which relay UEs 115 to activate or deactivate for relaying communications for the first UE 115.

Figure 2:
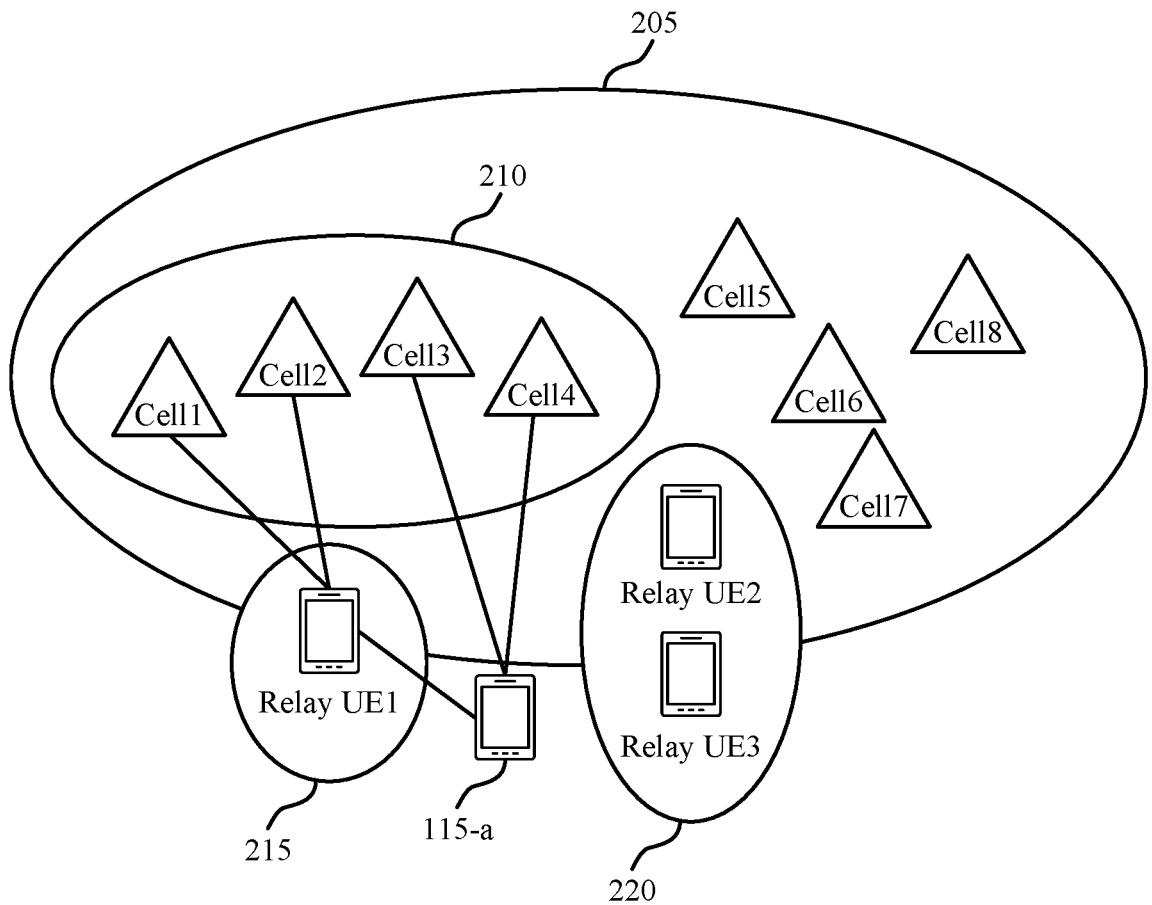
FIG. 2 illustrates an example of a wireless communications system that supports sidelink measurement reporting for sidelink relays in accordance with one or more aspects of the present disclosure.

FIG. 2 illustrates an example of a wireless communications system 200 that supports sidelink measurement reporting for sidelink relays in accordance with one or more aspects of the present disclosure. The wireless communications system 200 may implement aspects of the wireless communications system 100. For instance, the wireless communications system 200 may support efficient techniques for reporting suitable measurements to activate or deactivate relay UEs 115.

The wireless communications system 200 includes a first UE 115-*a*, which may be an example of a UE 115 described herein. The wireless communications system 200 also includes an activated UE relay set 215 (e.g., for layer 1 (L1) or layer 2 (L2) mobility) and a deactivated UE relay set 220 (e.g., for L1 or L2 mobility). The activated UE relay set 215 may include relay UEs 115 activated for relaying communications for the first UE 115-*a* (e.g., activated and actively serving the first UE 115-*a*), and the deactivated UE relay set 220 may include relay UEs 115 deactivated for relaying communications for the first UE 115-*a* (e.g., deactivated and prepared to serve the first UE 115-*a*). The wireless communications system 200 also includes a configured cell set 205 and an activated cell set 210 (e.g., for L1 or L2 mobility). The configured cell set 205 may include cells (e.g., supported by one or more network entities, such as network entities 105 of FIG. 1) configured for communications with the first UE 115-*a*, and the activated cell set 210 may include cells activated for communications with the first UE 115-*a*.

In some examples, a network entity 105 may use L1 or L2 signaling (e.g., a MAC-CE or DCI) to select or indicate relay UEs 115 to serve as relays for the first UE 115-*a*. The first UE 115-*a* may be connected to a same network entity 105 as the relay UEs 115. The relay UEs 115 that have L1 or L2 mobility support capability and are configured for relaying communications for the first UE 115-*a* may be a part of a configured UE relay set. Relaying communications for the first UE 115 may include receiving signaling from the first UE 115-*a* and transmitting or forwarding the signaling to another device or receiving signaling from another device and transmitting or forwarding the signaling to the first UE 115-*a*. The configured UE relay set may include the activated UE relay set 215 and the deactivated UE relay set 220. In some examples, the relay UEs 115 in the activated UE relay set 215 may be capable of relaying communications between the first UE 115-*a* and activated cells or deactivated cells in the configured cell set 205, and the relay UEs 115 in the deactivated UE relay set 220 may be capable of relaying communications between the first UE 115-*a* and activated cells or deactivated cells in the configured cell set 205.

Figure 3:
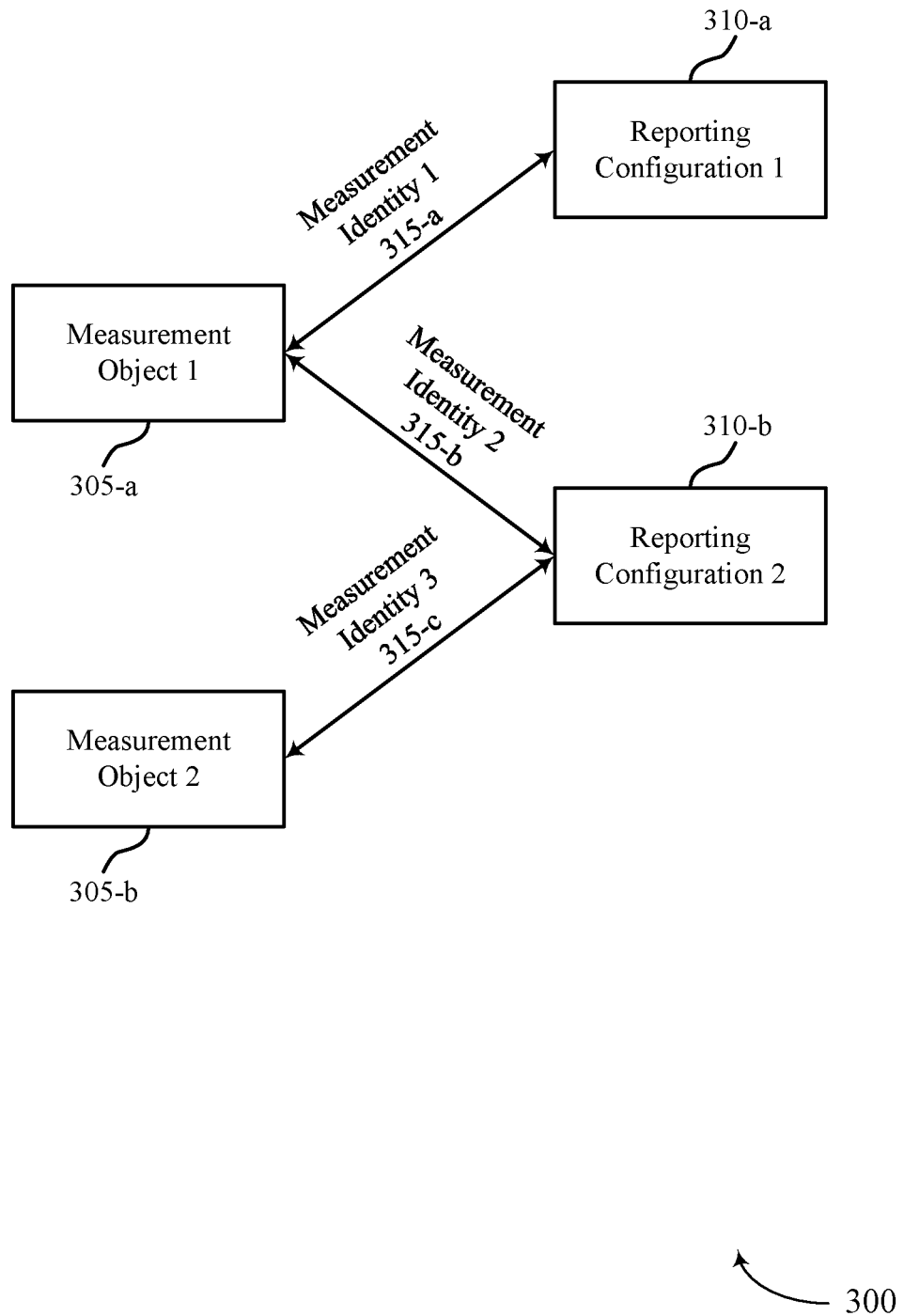
FIG. 3 illustrates an example of a sidelink measurement configuration in accordance with one or more aspects of the present disclosure.

FIG. 3 illustrates an example of a sidelink measurement configuration 300 in accordance with one or more aspects of the present disclosure. A network entity 105 may configure a first UE 115-*a* to perform sidelink measurements and report the sidelink measurements in accordance with the sidelink measurement configuration 300 (e.g., included in an RRCReconfigurationSidelink message). Alternatively, a second UE 115 may configure a first UE 115-*a* (e.g., an associated peer UE 115) to perform sidelink measurements and report the sidelink measurements in accordance with the sidelink measurement configuration 300 (e.g., included in an RRCReconfigurationSidelink message). The sidelink measurement configuration 300 may include parameters for a PC5-RRC connection such as sidelink measurement objects 305, sidelink reporting configurations 310, sidelink measurement identities 315, or sidelink quantity configurations.

A sidelink measurement object (or measurement object) 305 may indicate resources (e.g., a location of time and frequency resources) including reference signals to be measured by the first UE 115-*a*. A sidelink reporting configuration (or reporting configuration) 310 may indicate reporting criteria (e.g., periodic or based on an event), a reference signal type, or a format for reporting sidelink measurements. A sidelink measurement identity (or measurement identity) 315 may indicate a link between a measurement object 305 and a reporting configuration 310, where the reporting configuration 310 may be used for reporting measurements on the linked measurement object 305. A sidelink quantity configuration (or quantity configuration) may indicate parameters for filtering sidelink measurements before evaluating and reporting the sidelink measurements. Evaluating the sidelink measurements may refer to determining whether reporting criteria are satisfied based on the sidelink measurements.

In the example of FIG. 3, the sidelink measurement configuration 300 may indicate that the first UE 115-*a* is to perform measurements on the measurement object 305-*a* and report the measurements on the measurement object 305-*a* in accordance with the reporting configuration 310-*a* (e.g., based on the measurement identity 315-*a*) and the reporting configuration 310-*b* (e.g., based on the measurement identity 315-*b*). For instance, the first UE 115-*a* may transmit a first report of the measurements on the measurement object 305-*a* in accordance with the reporting configuration 310-*a*, and the first UE 115-*a* may transmit a second report of the measurements on the measurement object 305-*a* in accordance with the reporting configuration 310-*b*. The sidelink measurement configuration 300 may also indicate that the first UE 115-*a* is to perform measurements on the measurement object 305-*b* and report the measurements on the measurement object 305-*b* in accordance with the reporting configuration 310-*b* (e.g., based on the measurement identity 315-*c*). For instance, the first UE 115-*a* may transmit a third report of the measurements on the measurement object 305-*b* in accordance with the reporting configuration 310-*b*.

In some examples, the first UE 115-*a* may derive sidelink measurement results by measuring one or multiple demodulation reference signals (DMRSs) associated with a PC5-RRC configuration as configured by the sidelink measurement configuration 300. For all sidelink measurement results, the first UE 115-*a* may apply layer 3 (L3) filtering (e.g., in accordance with a sidelink quantity configuration) before using the measurement results for evaluation of reporting criteria and measurement reporting. The first UE 115-*a* may be configured to report measurements periodically or based on an event being triggered.

In an example of event-triggered reporting, a first event may be defined for an activated (e.g., serving) relay UE 115 becoming better than (e.g., exceeding or surpassing) a threshold. That is, the first UE 115-*a* may report measurements when the activated relay UE 115 (e.g., measurements associated with the activated relay UE 115) exceeds the threshold. In another example of event-triggered reporting, a second event may be defined for an activated (e.g., serving) relay UE 115 becoming worse than (e.g., falling below) a threshold. That is, the first UE 115-a may report measurements when the activated relay UE 115 (e.g., measurements associated with the activated relay UE 115) falls below the threshold.

An entering condition for the first event may be Ms−Hys>Thresh, and a leaving condition for the first event may be Ms+Hys<Threshold. An entering condition for the second event may be Ms+Hys<Thresh, and a leaving condition for the second event may be Ms−Hys>Thresh. Ms may be a sidelink measurement result of a sidelink frequency (e.g., without considering any offsets), Hys may be a hysteresis parameter for an event (e.g., sl-Hysteresis as defined within sl-ReportConfig for an event), and Thresh may be a threshold parameter for an event (e.g., sl-Threshold as defined within sl-ReportConfig for an event). If an entering condition for an event is satisfied, then one or more criteria associated with the event are satisfied, and the first UE 115-a may be triggered for measurement reporting. If a leaving condition for an event is satisfied, then one or more criteria associated with the event are not satisfied, and the first UE 115-a may not be triggered for measurement reporting.

Some events for measurement reporting (e.g., sidelink measurement events) may consider measurements performed on an activated relay UE (e.g., one sidelink). However, in the case of a sidelink relay, it may be appropriate to compare the sidelink quality between a first UE 115-a (e.g., a target UE 115) and different relays. For instance, measurements performed on an activated relay UE 115 (e.g., a single relay UE 115) may be insufficient for determining when to report measurements. Further, measurements performed on an activated relay UE 115 may also be insufficient for determining which relay UEs 115 to activate or deactivate.

The described techniques provide for configuring the first UE 115-a to report measurements based on measurements performed on multiple relay UEs 115 (e.g., including a deactivated relay UE 115). The first UE 115-a may also report the measurements performed on the multiple relay UEs 115 (e.g., including the deactivated relay UE 115). For instance, the described techniques may define a sidelink measurement event that compares measurements (e.g., reference signal received power (RSRP) measurements) of sidelinks between the first UE 115-a and more than one sidelink relay UEs 115.

In one aspect, a third event may be defined for a deactivated relay UE 115 becoming better than an activated relay UE 115 by an offset. That is, the first UE 115-a may report measurements when the deactivated relay UE 115 (e.g., measurements associated with the deactivated relay UE 115) becomes better (e.g., exceeds), by an offset, than the activated relay UE 115 (e.g., measurements associated with the activated relay UE 115). In another aspect, a fourth event may be defined for a deactivated relay UE 115 becoming better than a threshold by an offset. That is, the first UE 115-a may report measurements when the deactivated relay UE 115 (e.g., measurements associated with the deactivated relay UE 115) exceeds the threshold by the offset. In yet another aspect, a fifth event may be defined for an activated relay UE 115 falls below a first threshold and a deactivated relay UE 115 becoming better than a second threshold. That is, the first UE 115-a may report measurements when the activated relay UE 115 (e.g., measurements associated with the activated relay UE 115) falls below the first threshold and the deactivated relay UE 115 (e.g., measurements associated with the deactivated relay UE 115) exceeds the second threshold.

An entering condition for the third event may be Md+Ofd−Hys>Ma, and a leaving condition for the third event may be Md+Ofd+Hys<Ma. An entering condition for the fourth event may be Md+Ofd−Hys>Thresh, and a leaving condition for the fourth event may be Md+Ofd+Hys<Thresh. An entering condition for the fifth event may be Ma+Hys<Thresh1; Md+Ofd−Hys>Thresh2, and a leaving condition for the fifth event may be Ma−Hys>Thresh1; Md+Ofd+Hys<Thresh2.

Md may be a sidelink measurement result of a sidelink between the first UE 115-a and a deactivated relay UE 115, Ma may be a sidelink measurement result of a sidelink between the first UE 115-a and an activated relay UE 115, Hys may be a hysteresis parameter for an event, Ofd may be a measurement object-specific offset for a deactivated relay UE 115, and Thresh, Thresh1, and Thresh2 may each be a threshold parameter for a corresponding event. If an entering condition for an event is satisfied, then one or more criteria associated with the event are satisfied, and the first UE 115-a may be triggered for measurement reporting. If a leaving condition for an event is satisfied, then one or more criteria associated with the event are not satisfied, and the first UE 115-a may not be triggered for measurement reporting.

A network entity 105 or a UE 115 may provide a first UE 115-a with various parameters for performing and reporting measurements using the described techniques.

In some examples, a network entity 105 or a UE 115 may provide (e.g., to the first UE 115-a) an offset (e.g., Ofd) for a measurement object within a configuration for the measurement object (e.g., sl-MeasObject) for a corresponding deactivated relay UE 115. The offset may be used to accommodate for a difference in sidelink reference signals from a deactivated relay UE 115 and an activated relay UE 115. For instance, the first UE 115-a may perform measurements on channel state information reference signals (CSI-RSs) from the deactivated relay UE 115, and the first UE 115-a may perform measurements on DMRSs from an activated relay UE 115. That is, sidelink reference signals from a deactivated relay UE 115 may be sidelink CSI-RSs, and sidelink reference signals from an activated relay UE 115 may be sidelink DMRSs.

In some examples, a network entity 105 or a UE 115 may provide (e.g., to the first UE 115-a) thresholds for a corresponding event (e.g., Thresh, Thresh1, and Thresh2 may each be a threshold parameter for a corresponding event). The thresholds may be defined within a corresponding event in a sidelink report configuration (e.g., s5-threshold2 in sl-ReportConfig).

In some examples, a network entity 105 or a UE 115 may provide (e.g., to the first UE 115-a) an indication of one or more relay UEs 115 for the first UE 115-a to add to a list of relay UEs 115 for which the first UE 115-a is to perform and report measurements. The network entity or the UE 115 may also provide (e.g., to the first UE 115-a) an indication of one or more relay UEs 115 for the first UE 115-a to remove from a list of relay UEs 115 for which the first UE 115-a is to perform and report measurements. A list of relay UEs 115 for which the first UE 115-a is to perform and report measurements may be configured per measurement object. For instance, in a sidelink measurement object configuration, the network entity or the UE 115 may include an otherRelaysToAddList information element (IE) and an otherRelaysToRemoveList IE. The otherRelaysToAddList IE may indicate other sidelink relay channels that the first UE 115 may measure together with another sidelink relay link (e.g., for an activated relay UE 115). The otherRelaysToRemoveList IE may indicate sidelink relay channels that the first UE 115 may remove from a list of sidelink relay channels that the first UE 115 may measure.

Once the first UE 115-*a* determines to report measurements to a network entity 105 or a UE 115, the first UE 115-*a* may report the measurements for each relay UE 115 along with an indication of the relay UE 115 for which the measurements are reported. For instance, the first UE 115-*a* may include a pair of values including a sidelink relay identifier (e.g., sl-RelayId) and a measurement result (e.g., sl-RSRP) that indicate the measurement result (e.g., sidelink RSRP) for a corresponding sidelink relay channel. In some examples, a network entity 105 or a UE 115 may configure the first UE 115-*a* (e.g., in sl-ReportConfig) to report the pair of values for one or more events (e.g., S3, S4, and S5).

In some examples, a deactivated relay UE 115 may provide the first UE 115-*a* with the parameters for determining whether one or more criteria associated with an event are satisfied (e.g., the hysteresis values, offsets, or thresholds). For instance, hysteresis values, offsets, or thresholds may be configured via a message exchange between the deactivated relay UE 115 and the first UE 115-*a*. In some cases, the first UE 115-*a* may propose certain parameter values to the deactivated relay UE 115, and the deactivated relay UE 115 may send a response message to the first UE 115-*a* to accept one or more of the proposed values or suggest other parameter values. Thus, the parameter values may be link dependent. For instance, a candidate relay UE 115 may request high threshold and hysteresis values if the candidate relay UE 115 is experiencing high traffic (e.g., making it unlikely that the first UE 115-*a* will activate the candidate relay UE 115 for relaying communications for the first UE 115-*a*). That is, a candidate relay UE 115 may provide the first UE 115-*a* with parameters or parameter values based on traffic conditions, channel conditions, or the like.

Figure 4:
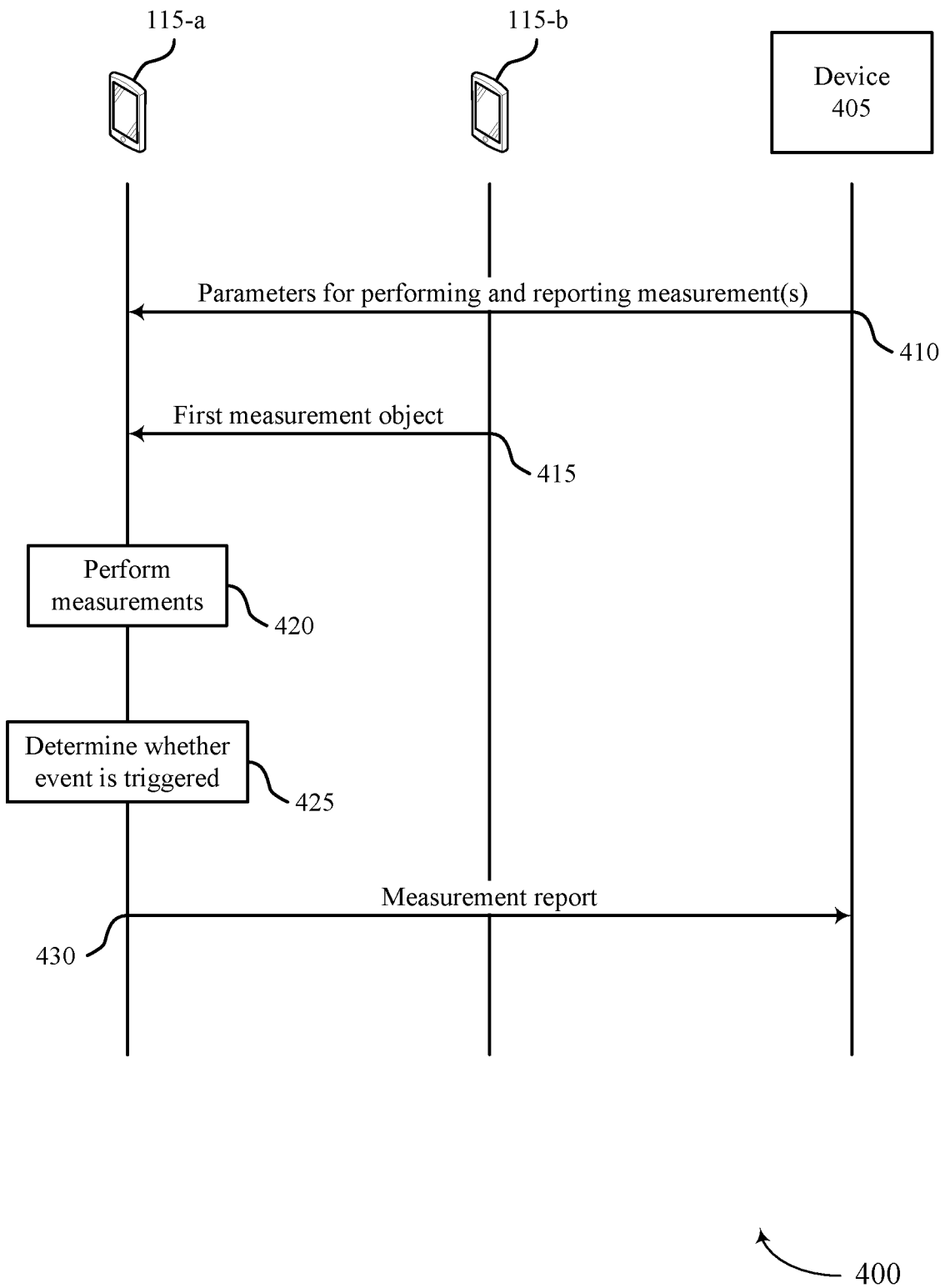
FIG. 4 illustrates an example of a process flow that supports sidelink measurement reporting for sidelink relays in accordance with one or more aspects of the present disclosure.

FIG. 4 illustrates an example of a process flow 400 that supports sidelink measurement reporting for sidelink relays in accordance with one or more aspects of the present disclosure. The process flow 400 includes a first UE 115-*a* and a relay UE 115-*b*, which may be examples of UEs 115 described herein. The process flow 400 also includes a device 405, which may be an example of a UE 115 or a network entity 105 described herein. The process flow 400 may implement aspects of the wireless communications system 100 or the wireless communications system 200. For instance, the process flow 400 may support efficient techniques for reporting suitable measurements to activate or deactivate relay UEs 115.

In the following description of the process flow 400, the signaling exchanged between the first UE 115-*a*, the relay UE 115-*b*, and the device 405 may be exchanged in a different order than the example order shown, or the operations performed by the first UE 115-*a*, the relay UE 115-*b*, and the device 405 may be performed in different orders or at different times. Some operations may also be omitted from the process flow 400, and other operations may be added to the process flow 400.

As described herein, satisfying a threshold may, depending on the context, refer to a value (e.g., a measurement or measurement value) being greater than the threshold, greater than or equal to the threshold, less than the threshold, less than or equal to the threshold, equal to the threshold, not equal to the threshold, or the like.

At 410, the first UE 115-*a* may receive, and the device 405 may transmit, an indication of one or more parameters for performing and reporting a first measurement of a first measurement object associated with the relay UE 115-*b*. The relay UE 115-*b* may be deactivated for relaying communications for the first UE 115-*a* (e.g., may be an example of a deactivated relay UE 115). The one or more parameters may include one or more hysteresis values, one or more thresholds, one or more offsets, or a combination thereof.

In some examples, the one or more parameters may include an offset (e.g., greater than or equal to zero) associated with the first measurement object of the relay UE 115-*b*. For instance, the one or more parameters may include an offset for each measurement object that the first UE 115-*a* is configured to measure. In some examples, the one or more parameters may include one or more thresholds associated with an event. For instance, the one or more parameters may include one or more thresholds for each event that may trigger measurement reporting at the first UE 115-*a*. The offset or the one or more thresholds may be for determining whether one or more criteria (e.g., conditions) associated with an event are satisfied. If the one or more criteria associated with the event are satisfied, the event may be triggered, and the first UE 115-*a* may report measurements to the device 405. If the one or more criteria associated with the event are not satisfied, the event may not be triggered, and the first UE 115-*a* may avoid reporting measurements to the device 405.

In some examples, the one or more parameters may include one or more deactivated relay UEs for the first UE 115-*a* to add to a list of relay UEs for which the first UE 115-*a* is to perform and report measurements. For instance, the one or more parameters may indicate that the first UE 115-*a* is to add the relay UE 115-*b* to a list of relay UEs for which the first UE 115-*a* is to perform and report measurements. In some examples, the one or more parameters may include one or more deactivated relay UEs for the first UE 115-*a* to remove from a list of relay UEs for which the first UE 115-*a* is to perform and report measurements. After the first UE 115-*a* adds relay UEs to and removes relay UEs from the list of relay UEs, the first UE 115-*a* may be ready to perform measurements on measurement objects from the list of relay UEs.

At 415, the first UE 115-*a* may receive the first measurement object from the relay UE 115-*b*. The first measurement object may correspond to or indicate reference signals from the relay UE 115-*b* on a set of resources. Thus, receiving the first measurement object may correspond to receiving the reference signals from the relay UE 115-*b* on the set of resources.

At 420, the first UE 115-*a* may perform the first measurement of the first measurement object associated with the relay UE 115-*b* in accordance with the one or more parameters received at 410.

At 425, the first UE 115-*a* may determine whether an event is triggered based on the measurements performed at 420. For instance, the first UE 115-*a* may determine whether one or more criteria associated with the event are satisfied. The one or more criteria may be based on the first measurement of the first measurement object associated with the relay UE 115-*b*. For instance, the one or more criteria may be based on measurements performed on measurement objects associated with multiple relay UEs or one or more deactivated relay UEs. The event may be one of one or more events, including, for example, a third event (e.g., S3), a fourth event (e.g., S4), or a fifth event (e.g., S5).

For the third event, the one or more criteria associated with the third event being satisfied may include a first value that is based on the first measurement of the first measurement object being greater, by an offset, than a second value that is based on a second measurement of a second measurement object associated with an activated relay UE. The first UE 115 may receive (e.g., from the device 405) an indication of the offset for the first measurement object as part of the one or more parameters at 410. The first UE 115-*a* may perform the second measurement of the second measurement object associated with the activated relay UE. In some examples, the first UE 115-*a* may receive, and the device 405 may transmit, an indication of one or more other parameters for performing and reporting the second measurement of the second measurement object associated with the activated relay UE.

For the fourth event, the one or more criteria associated with the fourth event being satisfied may include a first value that is based on the first measurement of the first measurement object being greater than a threshold by an offset. The first UE 115-*a* may receive (e.g., from the device 405) an indication of the threshold for the fourth event, the offset for the first measurement object, or both as part of the one or more parameters at 410.

For the fifth event, the one or more criteria associated with the fifth event being satisfied may include a first value that is based on the first measurement of the first measurement object being greater than a first threshold by a first offset and a second value that is based on a second measurement of a second measurement object associated with an activated relay UE being less than a second threshold by a second offset. The first UE 115-*a* may receive (e.g., from the device 405) an indication of the first offset for the first measurement object and the first threshold for the fifth event as part of the one or more parameters at 410. The first UE 115-*a* may perform the second measurement of the second measurement object associated with the activated relay UE. In some examples, the first UE 115-*a* may receive, and the device 405 may transmit, an indication of one or more other parameters for performing and reporting the second measurement of the second measurement object associated with the activated relay UE 115. For instance, the first UE 115-*a* may receive (e.g., from the device 405) an indication of the second offset for the second measurement object and the second threshold for the fifth event as part of the one or more other parameters.

At 430, the first UE 115-*a* may transmit a measurement report indicating the first measurement of the first measurement object based on determining, at 425, that the event is triggered (e.g., that the first UE 115-*a* is triggered to report the first measurement based on the event). In some examples, the first UE 115-*a* may transmit the report indicating the first measurement of the first measurement object and indicating the relay UE 115-*b* (e.g., the deactivated relay UE) for which the first measurement is reported. The device 405 may receive the measurement report and may transmit an indication of one or more relay UEs for the first UE 115-*a* to activate or deactivate based on the measurement report. For instance, the first UE 115-*a* may receive an indication of relay UEs to activate or deactivate in response to transmitting the measurement report. In some examples, the device 405 receiving the measurement report from the first UE 115-*a* may be different from another device transmitting the indication of the parameters for performing and reporting measurements to the first UE 115-*a* (e.g., at 410).

In some examples, the device 405 may be the relay UE 115-*b*. In such examples, the relay UE 115-*b* may receive, from the first UE 115-*a*, an indication of one or more second parameters, the one or more second parameters for performing and reporting a first measurement of a first measurement object associated with the relay UE 115-*b*. That is, the first UE 115-*a* may recommend or suggest the one or more second parameters to the relay UE 115-*b*. The relay UE 115-*b* may then transmit, to the first UE 115-*a*, an indication of the one or more first parameters (e.g., at 410) for performing and reporting the first measurement of the first measurement object. The one or more first parameters may be based on the one or more second parameters. That is, the relay UE 115-*b* may select the one or more first parameters based on the one or more second parameters recommended or suggested by the first UE 115-*a*.

Figure 5:
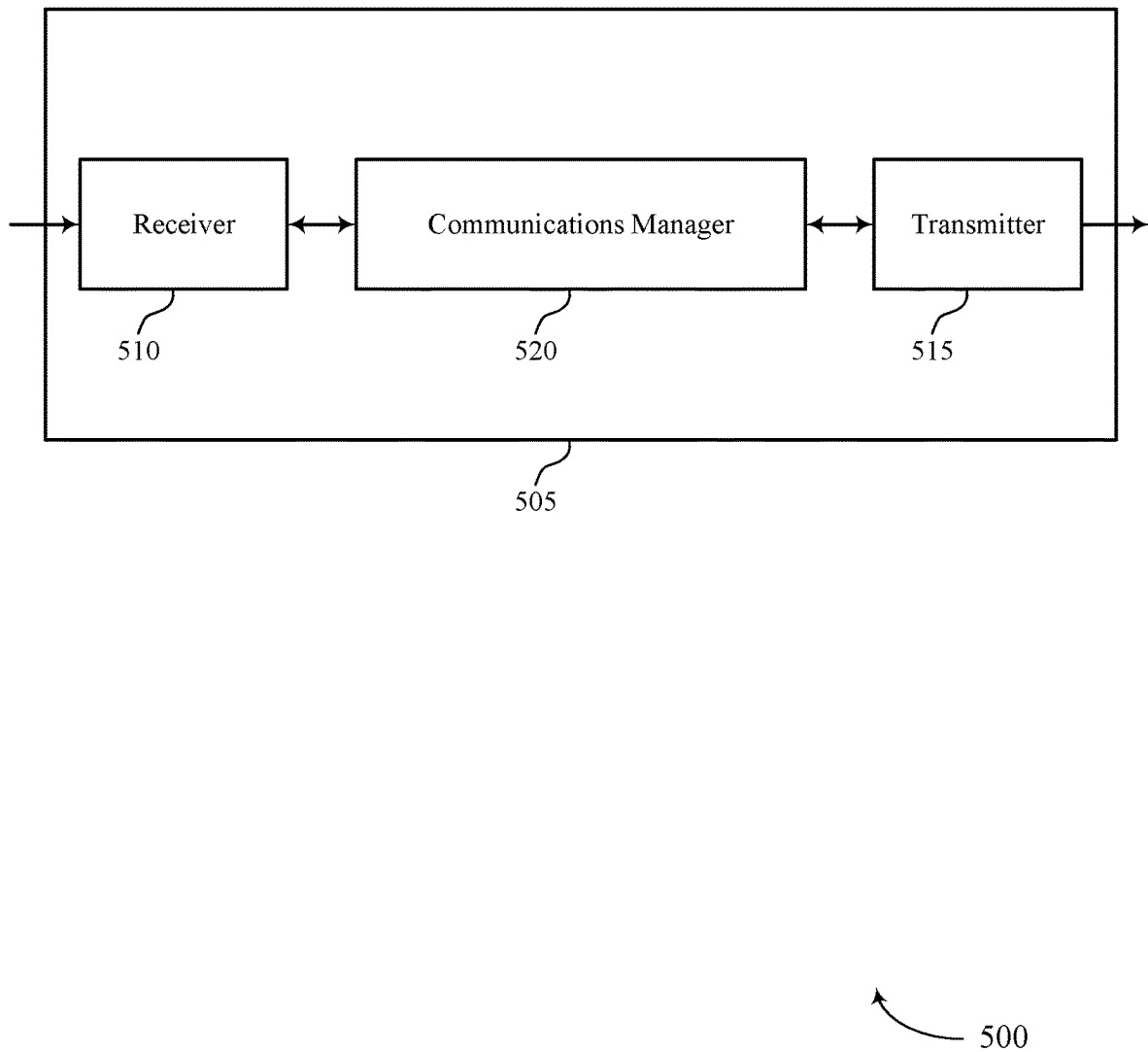
FIG. 5 and 6 show block diagrams of devices that support sidelink measurement reporting for sidelink relays in accordance with one or more aspects of the present disclosure.

FIG. 5 shows a block diagram 500 of a device 505 that supports sidelink measurement reporting for sidelink relays in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink measurement reporting for sidelink relays). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink measurement reporting for sidelink relays). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of sidelink measurement reporting for sidelink relays as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first UE in accordance with examples as disclosed herein. For example, the communications manager 520 may be configured as or otherwise support a means for receiving an indication of one or more parameters, the one or more parameters for performing and reporting a first measurement of a first measurement object associated with a deactivated relay UE. The communications manager 520 may be configured as or otherwise support a means for performing the first measurement of the first measurement object associated with the deactivated relay UE in accordance with the one or more parameters. The communications manager 520 may be configured as or otherwise support a means for transmitting a report indicating the first measurement based on one or more criteria associated with an event being satisfied, where the one or more criteria are based on the first measurement of the first measurement object associated with the deactivated relay UE.

Additionally, or alternatively, the communications manager 520 may support wireless communication at a relay UE in accordance with examples as disclosed herein. For example, the communications manager 520 may be configured as or otherwise support a means for receiving, from a first UE, an indication of one or more second parameters, the one or more second parameters for performing and reporting a first measurement of a first measurement object associated with the relay UE. The communications manager 520 may be configured as or otherwise support a means for transmitting, to the first UE, an indication of one or more first parameters, the one or more first parameters for performing and reporting the first measurement of the first measurement object associated with the relay UE, where the one or more first parameters are based on the one or more second parameters.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources. Because measurements performed on multiple relay UEs or deactivated relay UEs may be more useful for activating and deactivating relay UEs, the power, processing resources, and physical resources used to perform and report these measurements may be used more efficiently.

Figure 6:
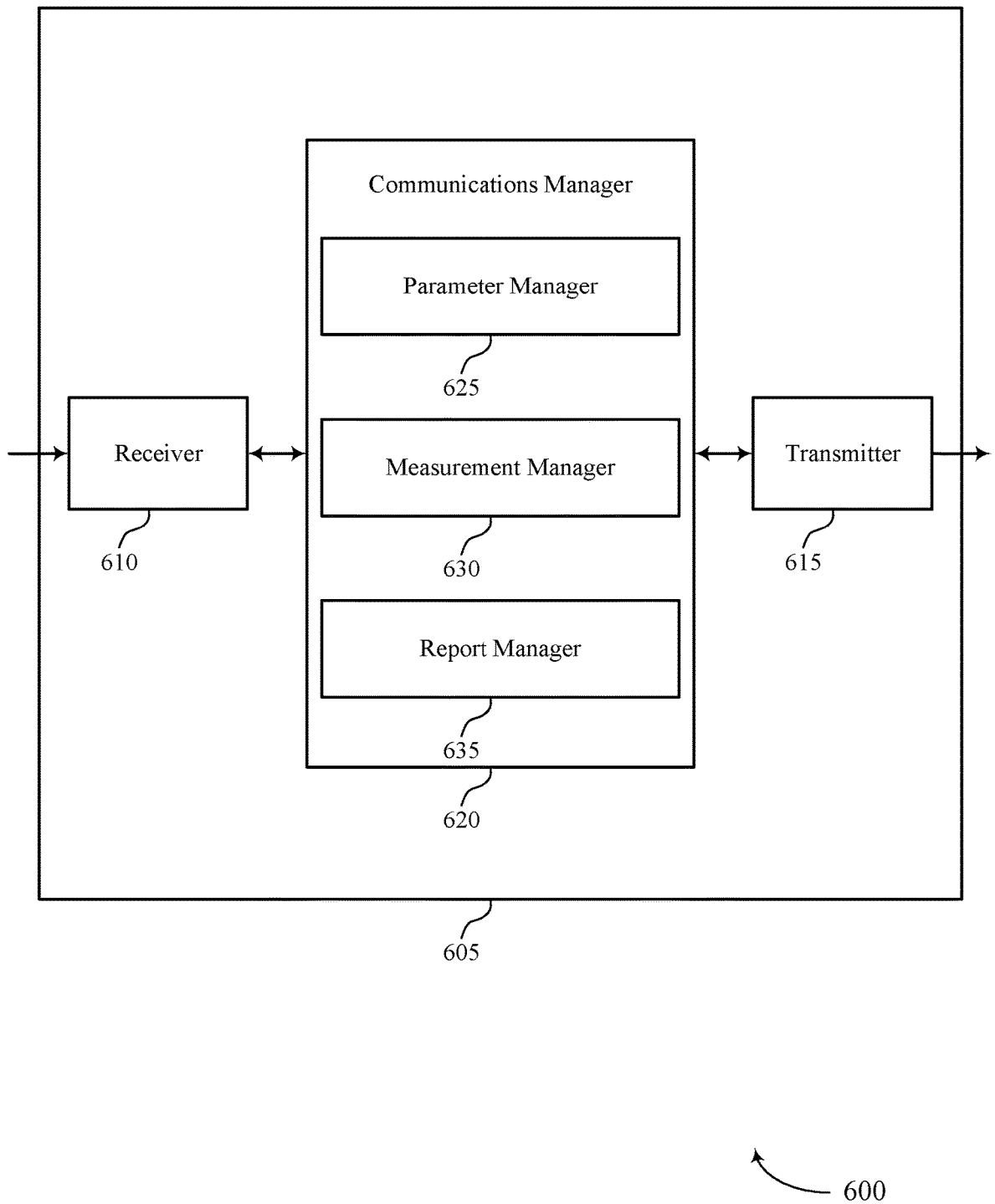

FIG. 6 shows a block diagram 600 of a device 605 that supports sidelink measurement reporting for sidelink relays in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink measurement reporting for sidelink relays). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink measurement reporting for sidelink relays). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of sidelink measurement reporting for sidelink relays as described herein. For example, the communications manager 620 may include a parameter manager 625, a measurement manager 630, a report manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. The parameter manager 625 may be configured as or otherwise support a means for receiving an indication of one or more parameters, the one or more parameters for performing and reporting a first measurement of a first measurement object associated with a deactivated relay UE. The measurement manager 630 may be configured as or otherwise support a means for performing the first measurement of the first measurement object associated with the deactivated relay UE in accordance with the one or more parameters. The report manager 635 may be configured as or otherwise support a means for transmitting a report indicating the first measurement based on one or more criteria associated with an event being satisfied, where the one or more criteria are based on the first measurement of the first measurement object associated with the deactivated relay UE.

Additionally, or alternatively, the communications manager 620 may support wireless communication at a relay UE in accordance with examples as disclosed herein. The parameter manager 625 may be configured as or otherwise support a means for receiving, from a first UE, an indication of one or more second parameters, the one or more second parameters for performing and reporting a first measurement of a first measurement object associated with the relay UE. The parameter manager 625 may be configured as or otherwise support a means for transmitting, to the first UE, an indication of one or more first parameters, the one or more first parameters for performing and reporting the first measurement of the first measurement object associated with the relay UE, where the one or more first parameters are based on the one or more second parameters.

Figure 7:
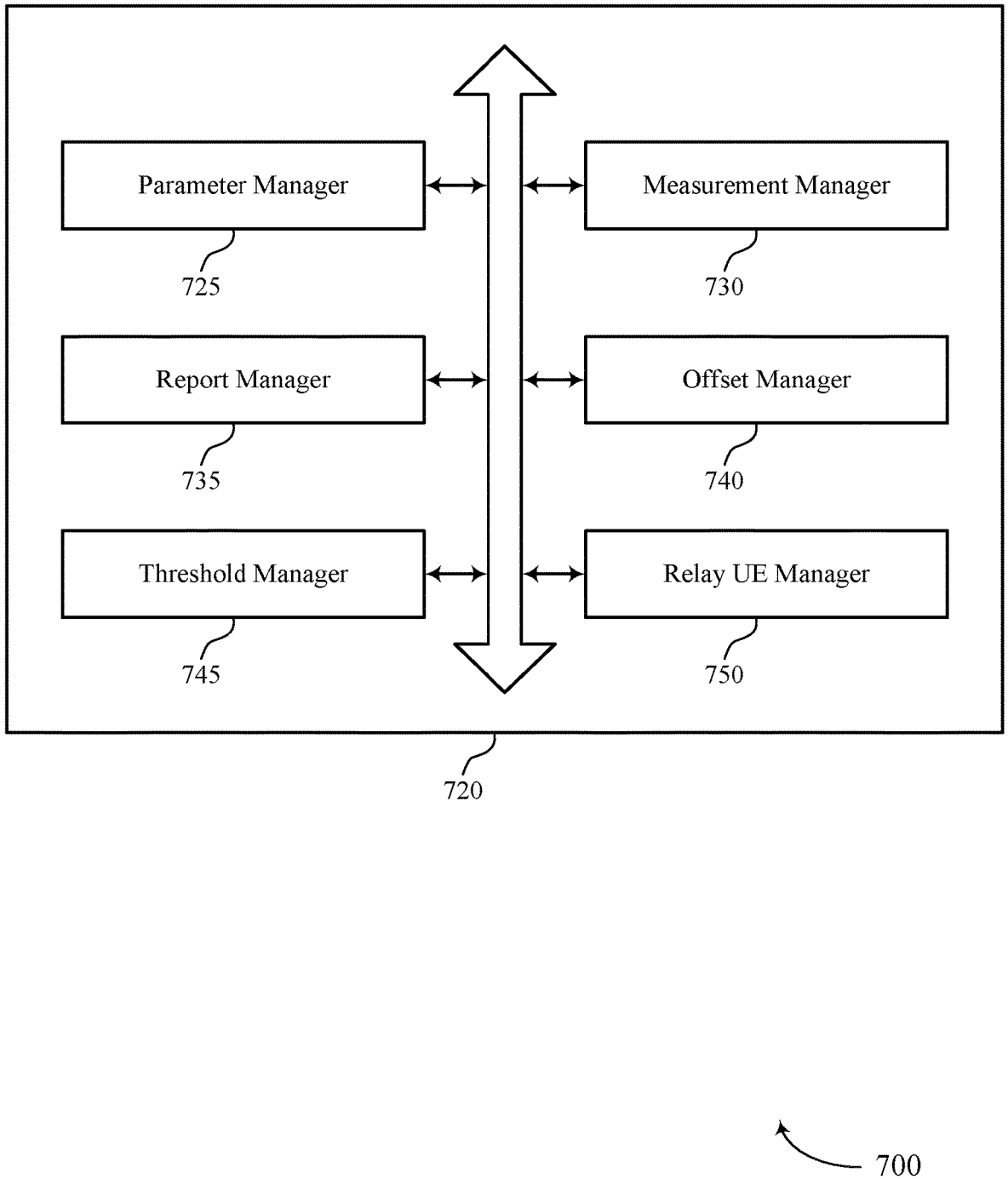
FIG. 7 shows a block diagram of a communications manager that supports sidelink measurement reporting for sidelink relays in accordance with one or more aspects of the present disclosure.

FIG. 7 shows a block diagram 700 of a communications manager 720 that supports sidelink measurement reporting for sidelink relays in accordance with one or more aspects of the present disclosure. The communications manager 720 may be an example of aspects of a communications manager 520, a communications manager 620, or both, as described herein. The communications manager 720, or various components thereof, may be an example of means for performing various aspects of sidelink measurement reporting for sidelink relays as described herein. For example, the communications manager 720 may include a parameter manager 725, a measurement manager 730, a report manager 735, an offset manager 740, a threshold manager 745, a relay UE manager 750, or any combination thereof. Each of these components may communicate, directly or indirectly, with one another (e.g., via one or more buses).

The communications manager 720 may support wireless communication at a first UE in accordance with examples as disclosed herein. The parameter manager 725 may be configured as or otherwise support a means for receiving an indication of one or more parameters, the one or more parameters for performing and reporting a first measurement of a first measurement object associated with a deactivated relay UE. The measurement manager 730 may be configured as or otherwise support a means for performing the first measurement of the first measurement object associated with the deactivated relay UE in accordance with the one or more parameters. The report manager 735 may be configured as or otherwise support a means for transmitting a report indicating the first measurement based on one or more criteria associated with an event being satisfied, where the one or more criteria are based on the first measurement of the first measurement object associated with the deactivated relay UE.

In some examples, the measurement manager 730 may be configured as or otherwise support a means for performing a second measurement of a second measurement object associated with an activated relay UE, where the one or more criteria associated with the event being satisfied includes a first value that is based on the first measurement being greater, by an offset, than a second value that is based on the second measurement, and where transmitting the report indicating the first measurement is based on the first value being greater than the second value by the offset.

In some examples, the one or more criteria associated with the event being satisfied includes a first value that is based on the first measurement being greater than a threshold by an offset. In some examples, transmitting the report indicating the first measurement is based on the first value being greater than the threshold by the offset.

In some examples, the measurement manager 730 may be configured as or otherwise support a means for performing a second measurement of a second measurement object associated with an activated relay UE, where the one or more criteria associated with the event being satisfied includes a first value that is based on the first measurement being greater than a first threshold and a second value that is based on the second measurement being less than a second threshold, and where transmitting the report indicating the first measurement is based on the first value being greater than the first threshold and the second value being less than the second threshold.

In some examples, to support receiving the indication of the one or more parameters, the offset manager 740 may be configured as or otherwise support a means for receiving an indication of an offset associated with the first measurement object associated with the deactivated relay UE, where the offset is used to determine whether the one or more criteria associated with the event are satisfied.

In some examples, to support receiving the indication of the one or more parameters, the threshold manager 745 may be configured as or otherwise support a means for receiving an indication of one or more thresholds associated with the event, where the one or more thresholds are used to determine whether the one or more criteria associated with the event are satisfied.

In some examples, to support receiving the indication of the one or more parameters, the relay UE manager 750 may be configured as or otherwise support a means for receiving an indication of one or more deactivated relay UEs to add to a list of relay UEs for which the first UE is to perform and report measurements.

In some examples, to support receiving the indication of the one or more parameters, the relay UE manager 750 may be configured as or otherwise support a means for receiving an indication of one or more deactivated relay UEs to remove from a list of relay UEs for which the first UE is to perform and report measurements.

In some examples, to support transmitting the report indicating the first measurement, the report manager 735 may be configured as or otherwise support a means for transmitting the report indicating the first measurement and indicating the deactivated relay UE for which the first measurement is reported.

In some examples, to support receiving the indication of the one or more parameters, the parameter manager 725 may be configured as or otherwise support a means for receiving the indication of the one or more parameters from the deactivated relay UE.

In some examples, the one or more parameters include one or more first parameters, and the parameter manager 725 may be configured as or otherwise support a means for transmitting an indication of one or more second parameters, the one or more second parameters for performing and reporting the first measurement of the first measurement object associated with the deactivated relay UE, where the one or more first parameters are based on the one or more second parameters.

In some examples, the one or more parameters include one or more hysteresis values, one or more thresholds, one or more offsets, or a combination thereof.

Additionally, or alternatively, the communications manager 720 may support wireless communication at a relay UE in accordance with examples as disclosed herein. In some examples, the parameter manager 725 may be configured as or otherwise support a means for receiving, from a first UE, an indication of one or more second parameters, the one or more second parameters for performing and reporting a first measurement of a first measurement object associated with the relay UE. In some examples, the parameter manager 725 may be configured as or otherwise support a means for transmitting, to the first UE, an indication of one or more first parameters, the one or more first parameters for performing and reporting the first measurement of the first measurement object associated with the relay UE, where the one or more first parameters are based on the one or more second parameters.

In some examples, the one or more first parameters or the one or more second parameters include one or more hysteresis values, one or more thresholds, one or more offsets, or a combination thereof.

Figure 8:
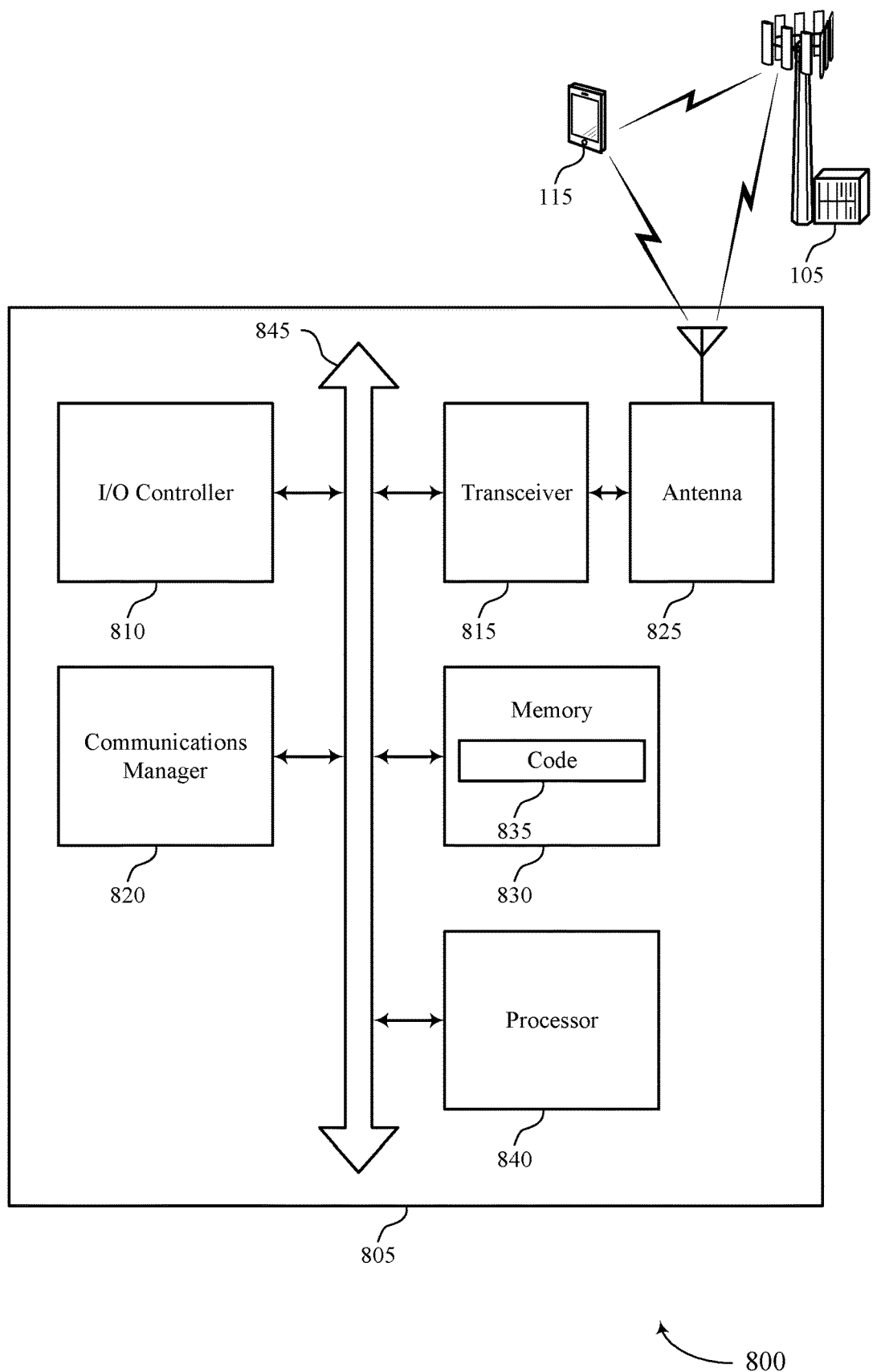
FIG. 8 shows a diagram of a system including a device that supports sidelink measurement reporting for sidelink relays in accordance with one or more aspects of the present disclosure.

FIG. 8 shows a diagram of a system 800 including a device 805 that supports sidelink measurement reporting for sidelink relays in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink measurement reporting for sidelink relays). For example, the device 805 or a component of the device 805 may include a processor 840 and memory 830 coupled with or to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving an indication of one or more parameters, the one or more parameters for performing and reporting a first measurement of a first measurement object associated with a deactivated relay UE. The communications manager 820 may be configured as or otherwise support a means for performing the first measurement of the first measurement object associated with the deactivated relay UE in accordance with the one or more parameters. The communications manager 820 may be configured as or otherwise support a means for transmitting a report indicating the first measurement based on one or more criteria associated with an event being satisfied, where the one or more criteria are based on the first measurement of the first measurement object associated with the deactivated relay UE.

Additionally, or alternatively, the communications manager 820 may support wireless communication at a relay UE in accordance with examples as disclosed herein. For example, the communications manager 820 may be configured as or otherwise support a means for receiving, from a first UE, an indication of one or more second parameters, the one or more second parameters for performing and reporting a first measurement of a first measurement object associated with the relay UE. The communications manager 820 may be configured as or otherwise support a means for transmitting, to the first UE, an indication of one or more first parameters, the one or more first parameters for performing and reporting the first measurement of the first measurement object associated with the relay UE, where the one or more first parameters are based on the one or more second parameters.

By including or configuring the communications manager 820 in accordance with examples as described herein, the device 805 may support techniques for reduced processing, reduced power consumption, and more efficient utilization of communication resources. Because measurements performed on multiple relay UEs or deactivated relay UEs may be more useful for activating and deactivating relay UEs, the power, processing resources, and physical resources used to perform and report these measurements may be used more efficiently.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of sidelink measurement reporting for sidelink relays as described herein, or the processor 840 and the memory 830 may be otherwise configured to perform or support such operations.

Figure 9:
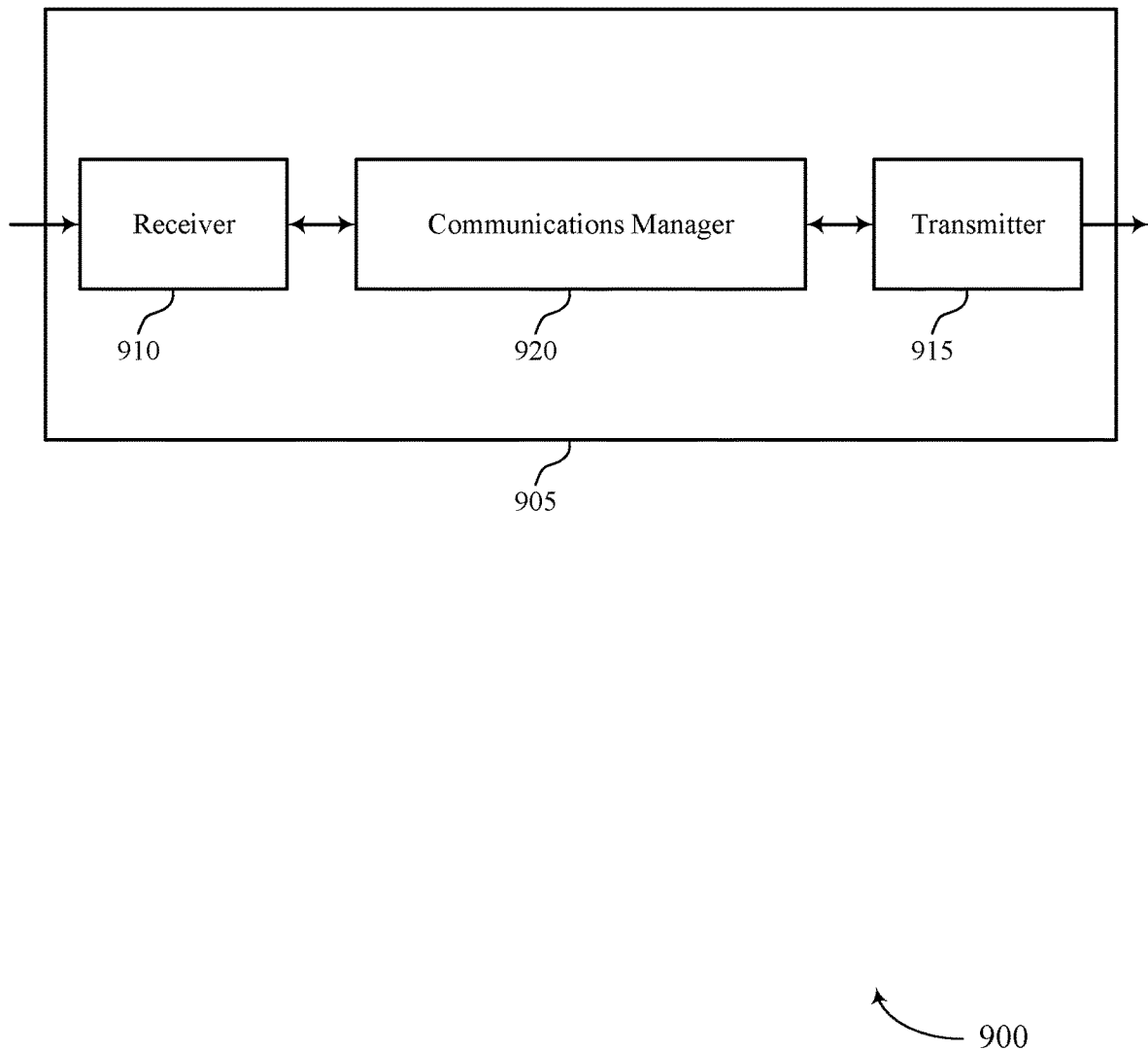
FIGS. 9 and 10 show block diagrams of devices that support sidelink measurement reporting for sidelink relays in accordance with one or more aspects of the present disclosure.

FIG. 9 shows a block diagram 900 of a device 905 that supports sidelink measurement reporting for sidelink relays in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of sidelink measurement reporting for sidelink relays as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a first UE, an indication of one or more parameters, the one or more parameters for performing and reporting a first measurement of a first measurement object associated with a deactivated relay UE. The communications manager 920 may be configured as or otherwise support a means for receiving, from the first UE, a report indicating the first measurement based on one or more criteria associated with an event being satisfied, where the one or more criteria are based on the first measurement of the first measurement object associated with the deactivated relay UE.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources. Because measurements performed on multiple relay UEs or deactivated relay UEs may be more useful for activating and deactivating relay UEs, the power, processing resources, and physical resources used to perform and report these measurements may be used more efficiently.

Figure 10:
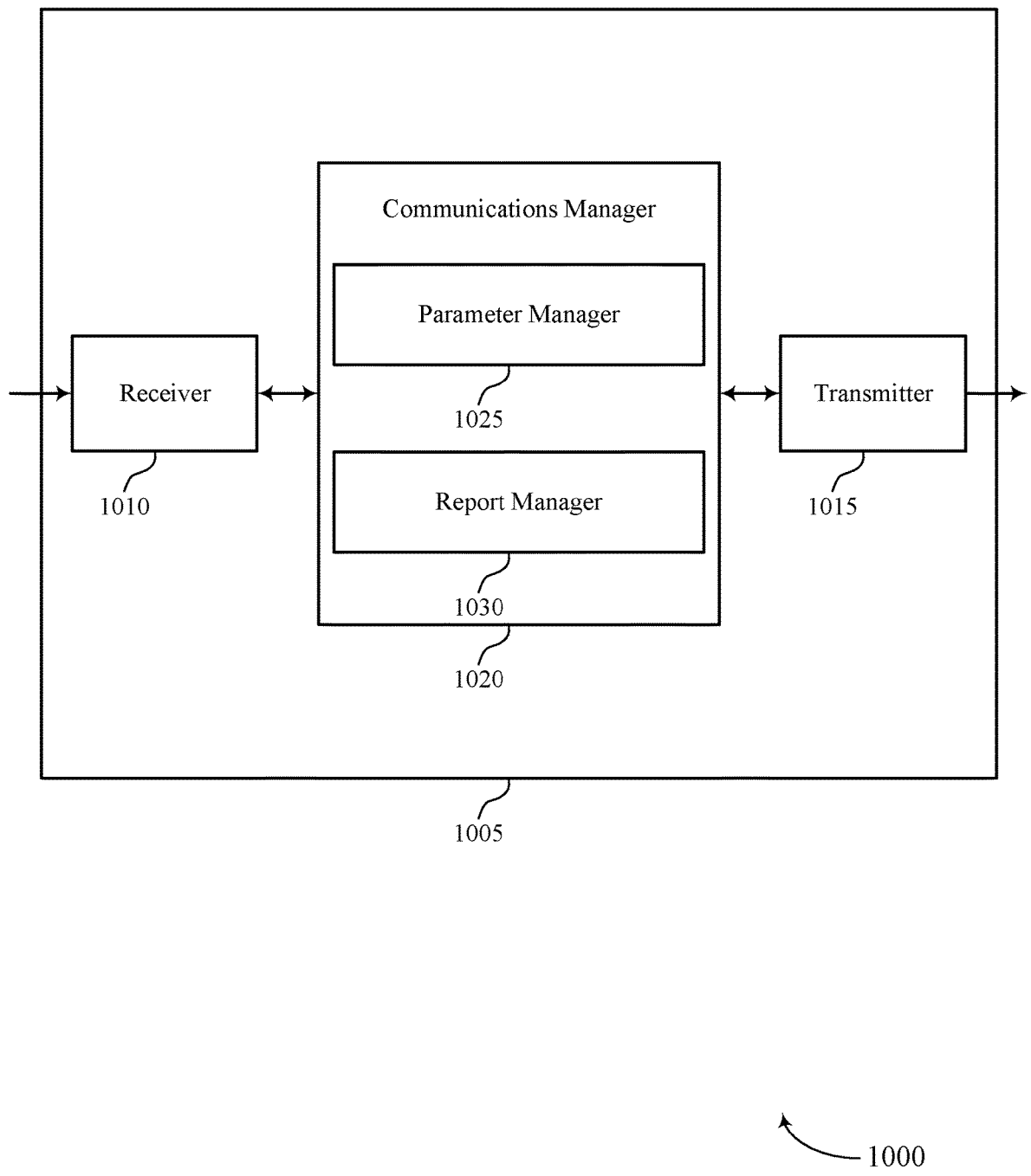

FIG. 10 shows a block diagram 1000 of a device 1005 that supports sidelink measurement reporting for sidelink relays in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of sidelink measurement reporting for sidelink relays as described herein. For example, the communications manager 1020 may include a parameter manager 1025 a report manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The parameter manager 1025 may be configured as or otherwise support a means for transmitting, to a first UE, an indication of one or more parameters, the one or more parameters for performing and reporting a first measurement of a first measurement object associated with a deactivated relay UE. The report manager 1030 may be configured as or otherwise support a means for receiving, from the first UE, a report indicating the first measurement based on one or more criteria associated with an event being satisfied, where the one or more criteria are based on the first measurement of the first measurement object associated with the deactivated relay UE.

Figure 11:
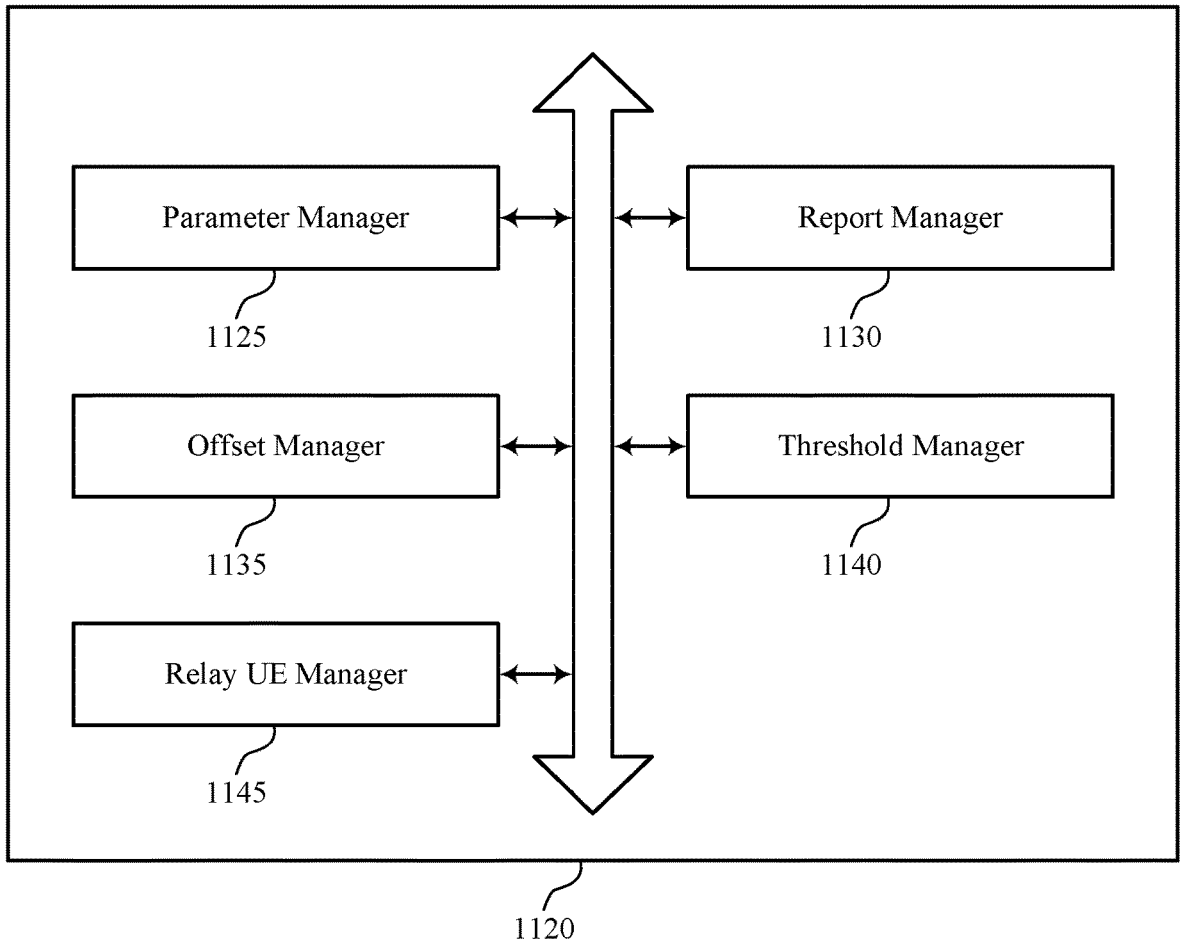
FIG. 11 shows a block diagram of a communications manager that supports sidelink measurement reporting for sidelink relays in accordance with one or more aspects of the present disclosure.

FIG. 11 shows a block diagram 1100 of a communications manager 1120 that supports sidelink measurement reporting for sidelink relays in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of sidelink measurement reporting for sidelink relays as described herein. For example, the communications manager 1120 may include a parameter manager 1125, a report manager 1130, an offset manager 1135, a threshold manager 1140, a relay UE manager 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The parameter manager 1125 may be configured as or otherwise support a means for transmitting, to a first UE, an indication of one or more parameters, the one or more parameters for performing and reporting a first measurement of a first measurement object associated with a deactivated relay UE. The report manager 1130 may be configured as or otherwise support a means for receiving, from the first UE, a report indicating the first measurement based on one or more criteria associated with an event being satisfied, where the one or more criteria are based on the first measurement of the first measurement object associated with the deactivated relay UE.

In some examples, the parameter manager 1125 may be configured as or otherwise support a means for transmitting, to the first UE, an indication of one or more other parameters, the one or more other parameters for performing and reporting a second measurement of a second measurement object associated with an activated relay UE, where the one or more criteria associated with the event being satisfied includes a first value that is based on the first measurement being greater, by an offset, than a second value that is based on the second measurement, and where receiving the report indicating the first measurement is based on the first value being greater than the second value by the offset.

In some examples, the one or more criteria associated with the event being satisfied includes a first value that is based on the first measurement being greater than a threshold by an offset. In some examples, receiving the report indicating the first measurement is based on the first value being greater than the threshold by the offset.

In some examples, the parameter manager 1125 may be configured as or otherwise support a means for transmitting, to the first UE, an indication of one or more other parameters, the one or more other parameters for performing and reporting a second measurement of a second measurement object associated with an activated relay UE, where the one or more criteria associated with the event being satisfied includes a first value that is based on the first measurement being greater than a first threshold and a second value that is based on the second measurement being less than a second threshold, and where receiving the report indicating the first measurement is based on the first value being greater than the first threshold and the second value being less than the second threshold.

In some examples, to support transmitting the indication of the one or more parameters, the offset manager 1135 may be configured as or otherwise support a means for transmitting an indication of an offset associated with the first measurement object associated with the deactivated relay UE, where the offset is used to determine whether the one or more criteria associated with the event are satisfied.

In some examples, to support transmitting the indication of the one or more parameters, the threshold manager 1140 may be configured as or otherwise support a means for transmitting an indication of one or more thresholds associated with the event, where the one or more thresholds are used to determine whether the one or more criteria associated with the event are satisfied.

In some examples, to support transmitting the indication of the one or more parameters, the relay UE manager 1145 may be configured as or otherwise support a means for transmitting an indication of one or more deactivated relay UEs to add to a list of relay UEs for which the first UE is to perform and report measurements.

In some examples, receiving an indication of one or more deactivated relay UEs to remove from a list of relay UEs for which the first UE is to perform and report measurements.

In some examples, to support receiving the report indicating the first measurement, the report manager 1130 may be configured as or otherwise support a means for receiving the report indicating the first measurement and indicating the deactivated relay UE for which the first measurement is reported.

In some examples, the one or more parameters include one or more hysteresis values, one or more thresholds, one or more offsets, or a combination thereof.

Figure 12:
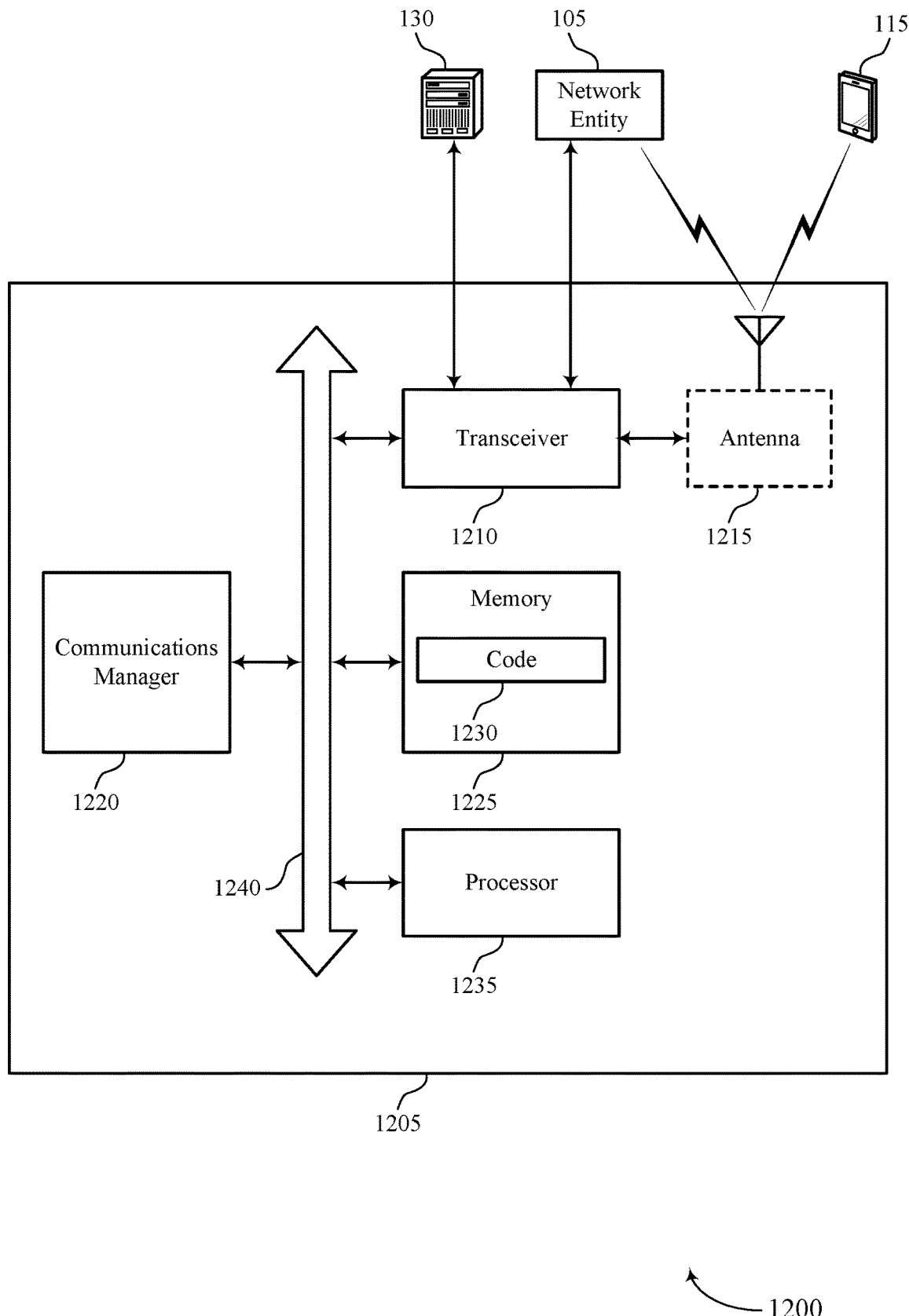
FIG. 12 shows a diagram of a system including a device that supports sidelink measurement reporting for sidelink relays in accordance with one or more aspects of the present disclosure.

FIG. 12 shows a diagram of a system 1200 including a device 1205 that supports sidelink measurement reporting for sidelink relays in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting sidelink measurement reporting for sidelink relays). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a first UE, an indication of one or more parameters, the one or more parameters for performing and reporting a first measurement of a first measurement object associated with a deactivated relay UE. The communications manager 1220 may be configured as or otherwise support a means for receiving, from the first UE, a report indicating the first measurement based on one or more criteria associated with an event being satisfied, where the one or more criteria are based on the first measurement of the first measurement object associated with the deactivated relay UE.

By including or configuring the communications manager 1220 in accordance with examples as described herein, the device 1205 may support techniques for reduced processing, reduced power consumption, and more efficient utilization of communication resources. Because measurements performed on multiple relay UEs or deactivated relay UEs may be more useful for activating and deactivating relay UEs, the power, processing resources, and physical resources used to perform and report these measurements may be used more efficiently.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of sidelink measurement reporting for sidelink relays as described herein, or the processor 1235 and the memory 1225 may be otherwise configured to perform or support such operations.

Figure 13:
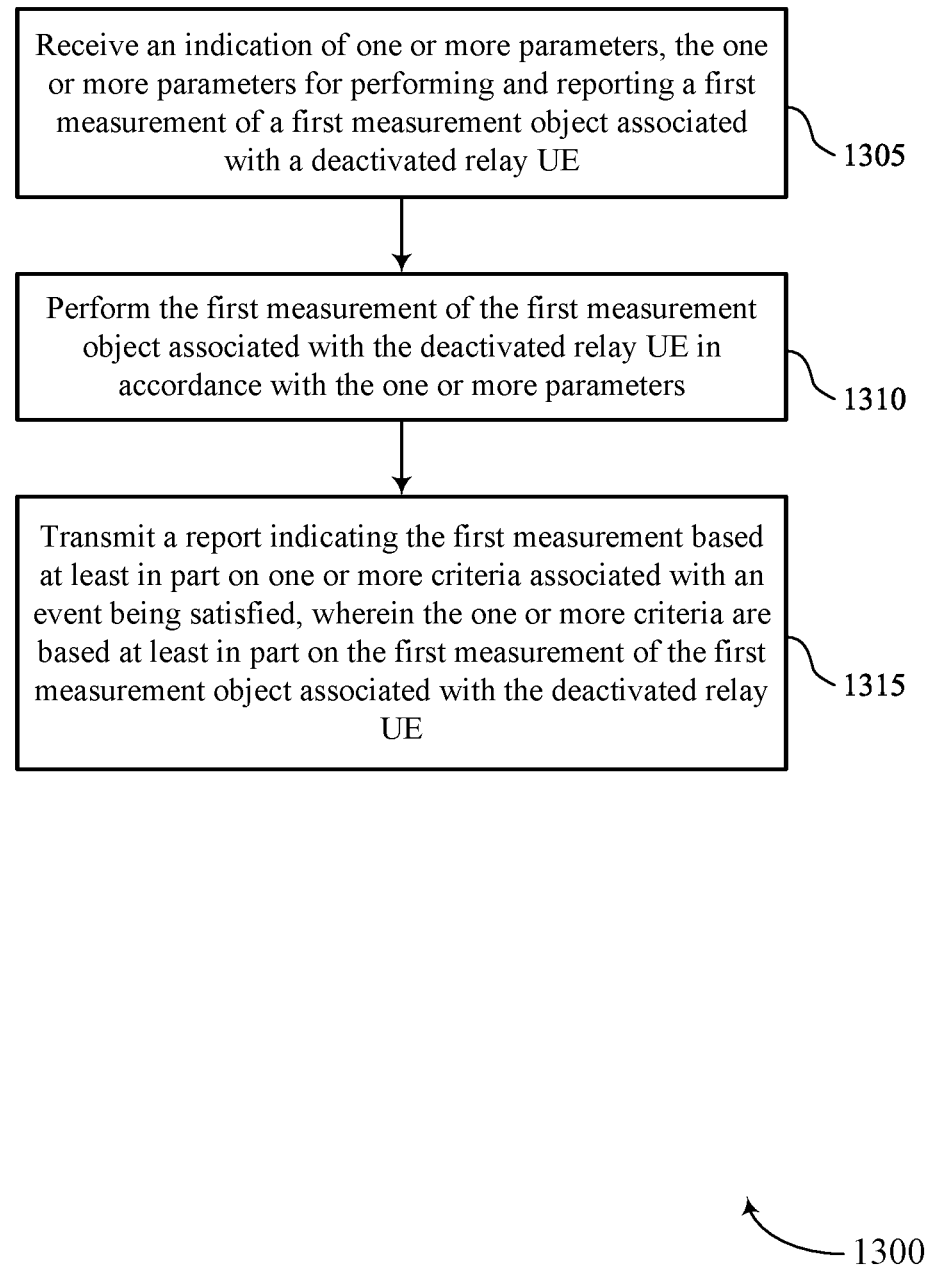
FIGS. 13 through 15 show flowcharts illustrating methods that support sidelink measurement reporting for sidelink relays in accordance with one or more aspects of the present disclosure.

FIG. 13 shows a flowchart illustrating a method 1300 that supports sidelink measurement reporting for sidelink relays in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving an indication of one or more parameters, the one or more parameters for performing and reporting a first measurement of a first measurement object associated with a deactivated relay UE. The operations of 1305 may be performed in accordance with examples as disclosed herein. In some examples, aspects of the operations of 1305 may be performed by a parameter manager 725 as described with reference to FIG. 7.

At 1310, the method may include performing the first measurement of the first measurement object associated with the deactivated relay UE in accordance with the one or more parameters. The operations of 1310 may be performed in accordance with examples as disclosed herein. In some examples, aspects of the operations of 1310 may be performed by a measurement manager 730 as described with reference to FIG. 7.

At 1315, the method may include transmitting a report indicating the first measurement based on one or more criteria associated with an event being satisfied, where the one or more criteria are based on the first measurement of the first measurement object associated with the deactivated relay UE. The operations of 1315 may be performed in accordance with examples as disclosed herein. In some examples, aspects of the operations of 1315 may be performed by a report manager 735 as described with reference to FIG. 7.

Figure 14:
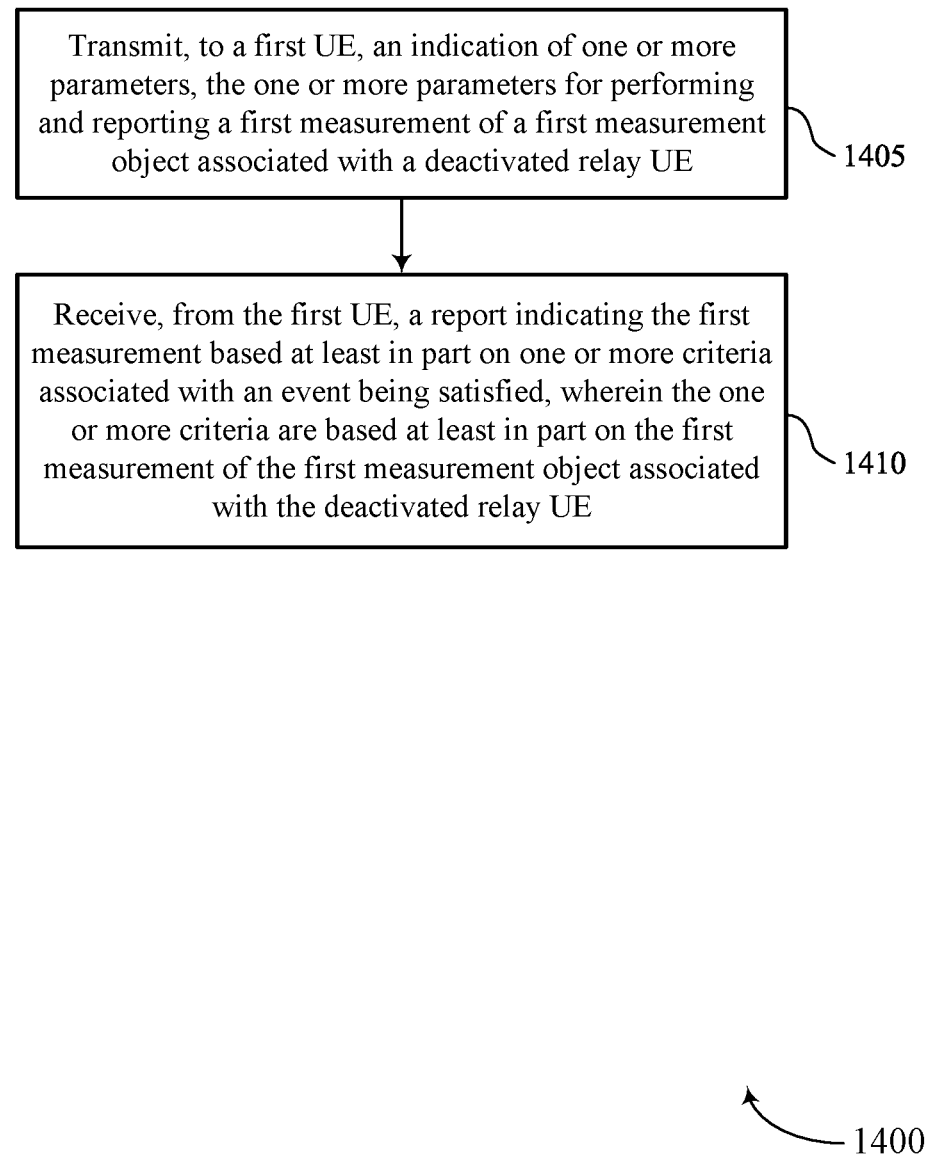

FIG. 14 shows a flowchart illustrating a method 1400 that supports sidelink measurement reporting for sidelink relays in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a first UE, an indication of one or more parameters, the one or more parameters for performing and reporting a first measurement of a first measurement object associated with a deactivated relay UE. The operations of 1405 may be performed in accordance with examples as disclosed herein. In some examples, aspects of the operations of 1405 may be performed by a parameter manager 1125 as described with reference to FIG. 11.

At 1410, the method may include receiving, from the first UE, a report indicating the first measurement based on one or more criteria associated with an event being satisfied, where the one or more criteria are based on the first measurement of the first measurement object associated with the deactivated relay UE. The operations of 1410 may be performed in accordance with examples as disclosed herein. In some examples, aspects of the operations of 1410 may be performed by a report manager 1130 as described with reference to FIG. 11.

Figure 15:
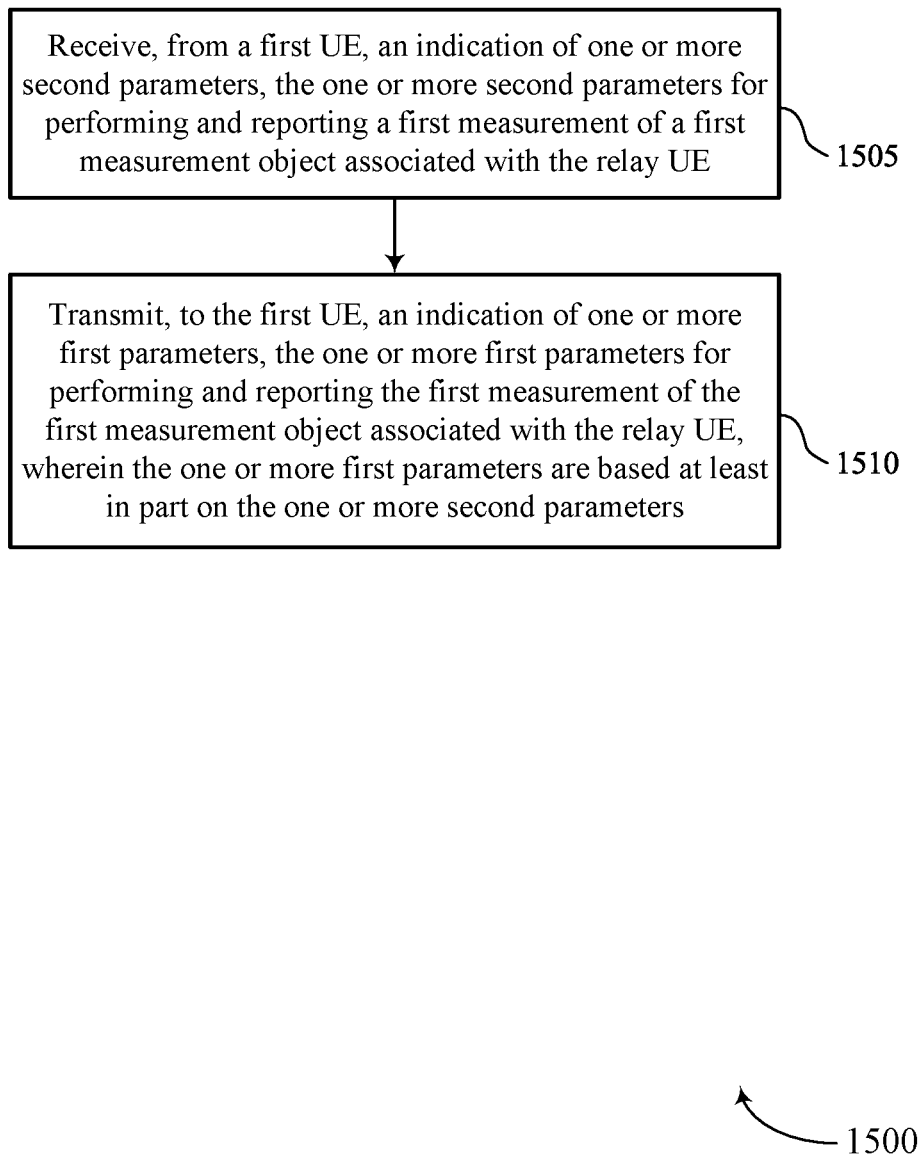

FIG. 15 shows a flowchart illustrating a method 1500 that supports sidelink measurement reporting for sidelink relays in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a first UE, an indication of one or more second parameters, the one or more second parameters for performing and reporting a first measurement of a first measurement object associated with the relay UE. The operations of 1505 may be performed in accordance with examples as disclosed herein. In some examples, aspects of the operations of 1505 may be performed by a parameter manager 725 as described with reference to FIG. 7.

At 1510, the method may include transmitting, to the first UE, an indication of one or more first parameters, the one or more first parameters for performing and reporting the first measurement of the first measurement object associated with the relay UE, where the one or more first parameters are based on the one or more second parameters. The operations of 1510 may be performed in accordance with examples as disclosed herein. In some examples, aspects of the operations of 1510 may be performed by a parameter manager 725 as described with reference to FIG. 7.

The following provides an overview of aspects of the present disclosure:

Aspect 1: A method for wireless communication at a first UE, comprising: receiving an indication of one or more parameters, the one or more parameters for performing and reporting a first measurement of a first measurement object associated with a deactivated relay UE; performing the first measurement of the first measurement object associated with the deactivated relay UE in accordance with the one or more parameters; and transmitting a report indicating the first measurement based at least in part on one or more criteria associated with an event being satisfied, wherein the one or more criteria are based at least in part on the first measurement of the first measurement object associated with the deactivated relay UE.

Aspect 2: The method of aspect 1, further comprising: performing a second measurement of a second measurement object associated with an activated relay UE, wherein the one or more criteria associated with the event being satisfied comprises a first value that is based at least in part on the first measurement being greater, by an offset, than a second value that is based at least in part on the second measurement, and wherein transmitting the report indicating the first measurement is based at least in part on the first value being greater than the second value by the offset.

Aspect 3: The method of any of aspects 1 through 2, wherein the one or more criteria associated with the event being satisfied comprises a first value that is based at least in part on the first measurement being greater than a threshold by an offset, and transmitting the report indicating the first measurement is based at least in part on the first value being greater than the threshold by the offset.

Aspect 4: The method of any of aspects 1 through 3, further comprising: performing a second measurement of a second measurement object associated with an activated relay UE, wherein the one or more criteria associated with the event being satisfied comprises a first value that is based at least in part on the first measurement being greater than a first threshold and a second value that is based at least in part on the second measurement being less than a second threshold, and wherein transmitting the report indicating the first measurement is based at least in part on the first value being greater than the first threshold and the second value being less than the second threshold.

Aspect 5: The method of any of aspects 1 through 4, wherein receiving the indication of the one or more parameters comprises: receiving an indication of an offset associated with the first measurement object associated with the deactivated relay UE, wherein the offset is used to determine whether the one or more criteria associated with the event are satisfied.

Aspect 6: The method of any of aspects 1 through 5, wherein receiving the indication of the one or more parameters comprises: receiving an indication of one or more thresholds associated with the event, wherein the one or more thresholds are used to determine whether the one or more criteria associated with the event are satisfied.

Aspect 7: The method of any of aspects 1 through 6, wherein receiving the indication of the one or more parameters comprises: receiving an indication of one or more deactivated relay UEs to add to a list of relay UEs for which the first UE is to perform and report measurements.

Aspect 8: The method of any of aspects 1 through 7, wherein receiving the indication of the one or more parameters comprises: receiving an indication of one or more deactivated relay UEs to remove from a list of relay UEs for which the first UE is to perform and report measurements.

Aspect 9: The method of any of aspects 1 through 8, wherein transmitting the report indicating the first measurement comprises: transmitting the report indicating the first measurement and indicating the deactivated relay UE for which the first measurement is reported.

Aspect 10: The method of any of aspects 1 through 9, wherein receiving the indication of the one or more parameters comprises: receiving the indication of the one or more parameters from the deactivated relay UE.

Aspect 11: The method of aspect 10, wherein the one or more parameters comprise one or more first parameters, the method further comprising: transmitting an indication of one or more second parameters, the one or more second parameters for performing and reporting the first measurement of the first measurement object associated with the deactivated relay UE, wherein the one or more first parameters are based at least in part on the one or more second parameters.

Aspect 12: The method of any of aspects 1 through 11, wherein the one or more parameters comprise one or more hysteresis values, one or more thresholds, one or more offsets, or a combination thereof.

Aspect 13: A method for wireless communication at a network entity, comprising: transmitting, to a first UE, an indication of one or more parameters, the one or more parameters for performing and reporting a first measurement of a first measurement object associated with a deactivated relay UE; and receiving, from the first UE, a report indicating the first measurement based at least in part on one or more criteria associated with an event being satisfied, wherein the one or more criteria are based at least in part on the first measurement of the first measurement object associated with the deactivated relay UE.

Aspect 14: The method of aspect 13, further comprising: transmitting, to the first UE, an indication of one or more other parameters, the one or more other parameters for performing and reporting a second measurement of a second measurement object associated with an activated relay UE, wherein the one or more criteria associated with the event being satisfied comprises a first value that is based at least in part on the first measurement being greater, by an offset, than a second value that is based at least in part on the second measurement, and wherein receiving the report indicating the first measurement is based at least in part on the first value being greater than the second value by the offset.

Aspect 15: The method of any of aspects 13 through 14, wherein the one or more criteria associated with the event being satisfied comprises a first value that is based at least in part on the first measurement being greater than a threshold by an offset, and receiving the report indicating the first measurement is based at least in part on the first value being greater than the threshold by the offset.

Aspect 16: The method of any of aspects 13 through 15, further comprising: transmitting, to the first UE, an indication of one or more other parameters, the one or more other parameters for performing and reporting a second measurement of a second measurement object associated with an activated relay UE, wherein the one or more criteria associated with the event being satisfied comprises a first value that is based at least in part on the first measurement being greater than a first threshold and a second value that is based at least in part on the second measurement being less than a second threshold, and wherein receiving the report indicating the first measurement is based at least in part on the first value being greater than the first threshold and the second value being less than the second threshold.

Aspect 17: The method of any of aspects 13 through 16, wherein transmitting the indication of the one or more parameters comprises: transmitting an indication of an offset associated with the first measurement object associated with the deactivated relay UE, wherein the offset is used to determine whether the one or more criteria associated with the event are satisfied.

Aspect 18: The method of any of aspects 13 through 17, wherein transmitting the indication of the one or more parameters comprises: transmitting an indication of one or more thresholds associated with the event, wherein the one or more thresholds are used to determine whether the one or more criteria associated with the event are satisfied.

Aspect 19: The method of any of aspects 13 through 18, wherein transmitting the indication of the one or more parameters comprises: transmitting an indication of one or more deactivated relay UEs to add to a list of relay UEs for which the first UE is to perform and report measurements.

Aspect 20: The method of any of aspects 13 through 19, wherein transmitting the indication of the one or more parameters transmitting receiving an indication of one or more deactivated relay UEs to remove from a list of relay UEs for which the first UE is to perform and report measurements.

Aspect 21: The method of any of aspects 13 through 20, wherein receiving the report indicating the first measurement comprises: receiving the report indicating the first measurement and indicating the deactivated relay UE for which the first measurement is reported.

Aspect 22: The method of any of aspects 13 through 21, wherein the one or more parameters comprise one or more hysteresis values, one or more thresholds, one or more offsets, or a combination thereof.

Aspect 23: A method for wireless communication at a relay UE, comprising: receiving, from a first UE, an indication of one or more second parameters, the one or more second parameters for performing and reporting a first measurement of a first measurement object associated with the relay UE; and transmitting, to the first UE, an indication of one or more first parameters, the one or more first parameters for performing and reporting the first measurement of the first measurement object associated with the relay UE, wherein the one or more first parameters are based at least in part on the one or more second parameters.

Aspect 24: The method of aspect 23, wherein the one or more first parameters or the one or more second parameters comprise one or more hysteresis values, one or more thresholds, one or more offsets, or a combination thereof.

Aspect 25: An apparatus for wireless communication at a first UE, comprising a processor; memory coupled with the processor; and instructions stored in the memory and executable by the processor to cause the apparatus to perform a method of any of aspects 1 through 12.

Aspect 26: An apparatus for wireless communication at a first UE, comprising at least one means for performing a method of any of aspects 1 through 12.

Aspect 27: A non-transitory computer-readable medium storing code for wireless communication at a first UE, the code comprising instructions executable by a processor to perform a method of any of aspects 1 through 12.

Aspect 28: An apparatus for wireless communication at a network entity, comprising a processor; memory coupled with the processor; and instructions stored in the memory and executable by the processor to cause the apparatus to perform a method of any of aspects 13 through 22.

Aspect 29: An apparatus for wireless communication at a network entity, comprising at least one means for performing a method of any of aspects 13 through 22.

Aspect 30: A non-transitory computer-readable medium storing code for wireless communication at a network entity, the code comprising instructions executable by a processor to perform a method of any of aspects 13 through 22.

Aspect 31: An apparatus for wireless communication at a relay UE, comprising a processor; memory coupled with the processor; and instructions stored in the memory and executable by the processor to cause the apparatus to perform a method of any of aspects 23 through 24.

Aspect 32: An apparatus for wireless communication at a relay UE, comprising at least one means for performing a method of any of aspects 23 through 24.

Aspect 33: A non-transitory computer-readable medium storing code for wireless communication at a relay UE, the code comprising instructions executable by a processor to perform a method of any of aspects 23 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   a processor;
   memory coupled with the processor; and
   instructions stored in the memory and executable by the processor to cause the apparatus to:
   receive an indication of one or more parameters, the one or more parameters for performing and reporting a first measurement of a first measurement object associated with a deactivated relay UE;
   perform the first measurement of the first measurement object associated with the deactivated relay UE in accordance with the one or more parameters; and
   transmit a report indicating the first measurement based at least in part on one or more criteria associated with an event being satisfied, wherein the one or more criteria are based at least in part on the first measurement of the first measurement object associated with the deactivated relay UE.

2. The apparatus of claim 1, wherein the instructions are further executable by the processor to cause the apparatus to:
   perform a second measurement of a second measurement object associated with an activated relay UE, wherein the one or more criteria associated with the event being satisfied comprises a first value that is based at least in part on the first measurement being greater, by an offset, than a second value that is based at least in part on the second measurement, and wherein transmitting the report indicating the first measurement is based at least in part on the first value being greater than the second value by the offset.

3. The apparatus of claim 1, wherein:
   the one or more criteria associated with the event being satisfied comprises a first value that is based at least in part on the first measurement being greater than a threshold by an offset, and
   transmitting the report indicating the first measurement is based at least in part on the first value being greater than the threshold by the offset.

4. The apparatus of claim 1, wherein the instructions are further executable by the processor to cause the apparatus to:
   perform a second measurement of a second measurement object associated with an activated relay UE, wherein the one or more criteria associated with the event being satisfied comprises a first value that is based at least in part on the first measurement being greater than a first threshold and a second value that is based at least in part on the second measurement being less than a second threshold, and wherein transmitting the report indicating the first measurement is based at least in part on the first value being greater than the first threshold and the second value being less than the second threshold.

5. The apparatus of claim 1, wherein the instructions to receive the indication of the one or more parameters are executable by the processor to cause the apparatus to:
   receive an indication of an offset associated with the first measurement object associated with the deactivated relay UE, wherein the offset is used to determine whether the one or more criteria associated with the event are satisfied.

6. The apparatus of claim 1, wherein the instructions to receive the indication of the one or more parameters are executable by the processor to cause the apparatus to:
   receive an indication of one or more thresholds associated with the event, wherein the one or more thresholds are used to determine whether the one or more criteria associated with the event are satisfied.

7. The apparatus of claim 1, wherein the instructions to receive the indication of the one or more parameters are executable by the processor to cause the apparatus to:
   receive an indication of one or more deactivated relay UEs to add to a list of relay UEs for which the first UE is to perform and report measurements.

8. The apparatus of claim 1, wherein the instructions to receive the indication of the one or more parameters are executable by the processor to cause the apparatus to:
   receive an indication of one or more deactivated relay UEs to remove from a list of relay UEs for which the first UE is to perform and report measurements.

9. The apparatus of claim 1, wherein the instructions to transmit the report indicating the first measurement are executable by the processor to cause the apparatus to:
   transmit the report indicating the first measurement and indicating the deactivated relay UE for which the first measurement is reported.

10. The apparatus of claim 1, wherein the instructions to receive the indication of the one or more parameters are executable by the processor to cause the apparatus to:
    receive the indication of the one or more parameters from the deactivated relay UE.

11. The apparatus of claim 10, wherein the one or more parameters comprise one or more first parameters, and the instructions are further executable by the processor to cause the apparatus to:

transmit an indication of one or more second parameters, the one or more second parameters for performing and reporting the first measurement of the first measurement object associated with the deactivated relay UE, wherein the one or more first parameters are based at least in part on the one or more second parameters.

12. The apparatus of claim 1, wherein the one or more parameters comprise one or more hysteresis values, one or more thresholds, one or more offsets, or a combination thereof.

13. An apparatus for wireless communication at a network entity, comprising:
a processor;
memory coupled with the processor; and
instructions stored in the memory and executable by the processor to cause the apparatus to:
transmit, to a first user equipment (UE), an indication of one or more parameters, the one or more parameters for performing and reporting a first measurement of a first measurement object associated with a deactivated relay UE; and
receive, from the first UE, a report indicating the first measurement based at least in part on one or more criteria associated with an event being satisfied, wherein the one or more criteria are based at least in part on the first measurement of the first measurement object associated with the deactivated relay UE.

14. The apparatus of claim 13, wherein the instructions are further executable by the processor to cause the apparatus to:
transmit, to the first UE, an indication of one or more other parameters, the one or more other parameters for performing and reporting a second measurement of a second measurement object associated with an activated relay UE, wherein the one or more criteria associated with the event being satisfied comprises a first value that is based at least in part on the first measurement being greater, by an offset, than a second value that is based at least in part on the second measurement, and wherein receiving the report indicating the first measurement is based at least in part on the first value being greater than the second value by the offset.

15. The apparatus of claim 13, wherein:
the one or more criteria associated with the event being satisfied comprises a first value that is based at least in part on the first measurement being greater than a threshold by an offset, and
receiving the report indicating the first measurement is based at least in part on the first value being greater than the threshold by the offset.

16. The apparatus of claim 13, wherein the instructions are further executable by the processor to cause the apparatus to:
transmit, to the first UE, an indication of one or more other parameters, the one or more other parameters for performing and reporting a second measurement of a second measurement object associated with an activated relay UE, wherein the one or more criteria associated with the event being satisfied comprises a first value that is based at least in part on the first measurement being greater than a first threshold and a second value that is based at least in part on the second measurement being less than a second threshold, and wherein receiving the report indicating the first measurement is based at least in part on the first value being greater than the first threshold and the second value being less than the second threshold.

17. The apparatus of claim 13, wherein the instructions to transmit the indication of the one or more parameters are executable by the processor to cause the apparatus to:
transmit an indication of an offset associated with the first measurement object associated with the deactivated relay UE, wherein the offset is used to determine whether the one or more criteria associated with the event are satisfied.

18. The apparatus of claim 13, wherein the instructions to transmit the indication of the one or more parameters are executable by the processor to cause the apparatus to:
transmit an indication of one or more thresholds associated with the event, wherein the one or more thresholds are used to determine whether the one or more criteria associated with the event are satisfied.

19. The apparatus of claim 13, wherein the instructions to transmit the indication of the one or more parameters are executable by the processor to cause the apparatus to:
transmit an indication of one or more deactivated relay UEs to add to a list of relay UEs for which the first UE is to perform and report measurements.

20. The apparatus of claim 13, wherein receiving an indication of one or more deactivated relay UEs to remove from a list of relay UEs for which the first UE is to perform and report measurements.

21. The apparatus of claim 13, wherein the instructions to receive the report indicating the first measurement are executable by the processor to cause the apparatus to:
receive the report indicating the first measurement and indicating the deactivated relay UE for which the first measurement is reported.

22. The apparatus of claim 13, wherein the one or more parameters comprise one or more hysteresis values, one or more thresholds, one or more offsets, or a combination thereof.

23. An apparatus for wireless communication at a deactivated relay user equipment (UE), comprising:
a processor;
memory coupled with the processor; and
instructions stored in the memory and executable by the processor to cause the apparatus to:
receive, from a first UE, an indication of one or more second parameters, the one or more second parameters for performing and reporting a first measurement of a first measurement object associated with the deactivated relay UE; and
transmit, to the first UE, an indication of one or more first parameters, the one or more first parameters for performing and reporting the first measurement of the first measurement object associated with the deactivated relay UE, wherein the one or more first parameters are based at least in part on the one or more second parameters.

24. The apparatus of claim 23, wherein the one or more first parameters or the one or more second parameters comprise one or more hysteresis values, one or more thresholds, one or more offsets, or a combination thereof.

25. A method for wireless communication at a first user equipment (UE), comprising:
receiving an indication of one or more parameters, the one or more parameters for performing and reporting a first measurement of a first measurement object associated with a deactivated relay UE;

performing the first measurement of the first measurement object associated with the deactivated relay UE in accordance with the one or more parameters; and transmitting a report indicating the first measurement based at least in part on one or more criteria associated with an event being satisfied, wherein the one or more criteria are based at least in part on the first measurement of the first measurement object associated with the deactivated relay UE.

26. The method of claim 25, further comprising:

performing a second measurement of a second measurement object associated with an activated relay UE, wherein the one or more criteria associated with the event being satisfied comprises a first value that is based at least in part on the first measurement being greater, by an offset, than a second value that is based at least in part on the second measurement, and wherein transmitting the report indicating the first measurement is based at least in part on the first value being greater than the second value by the offset.

27. The method of claim 25, wherein:

the one or more criteria associated with the event being satisfied comprises a first value that is based at least in part on the first measurement being greater than a threshold by an offset, and transmitting the report indicating the first measurement is based at least in part on the first value being greater than the threshold by the offset.

28. The method of claim 25, further comprising:

performing a second measurement of a second measurement object associated with an activated relay UE, wherein the one or more criteria associated with the event being satisfied comprises a first value that is based at least in part on the first measurement being greater than a first threshold and a second value that is based at least in part on the second measurement being less than a second threshold, and wherein transmitting the report indicating the first measurement is based at least in part on the first value being greater than the first threshold and the second value being less than the second threshold.

29. The method of claim 25, wherein receiving the indication of the one or more parameters comprises:

receiving an indication of an offset associated with the first measurement object associated with the deactivated relay UE, wherein the offset is used to determine whether the one or more criteria associated with the event are satisfied.

30. The method of claim 25, wherein receiving the indication of the one or more parameters comprises:

receiving an indication of one or more thresholds associated with the event, wherein the one or more thresholds are used to determine whether the one or more criteria associated with the event are satisfied.

* * * * *